(12) United States Patent
Gilbert

(10) Patent No.: US 8,427,006 B2
(45) Date of Patent: Apr. 23, 2013

(54) DEVICE FOR DISCONNECTING AT LEAST ONE APPLIANCE FROM THE ELECTRICAL MAINS, WHICH PROVIDES AT LEAST ONE OVERRIDE OPERATING MODE, A CONFIGURABLE DEVICE, SYSTEM AND CONFIGURATION METHOD

(75) Inventor: Jerome Gilbert, Levallois-Perret (FR)

(73) Assignee: Ergylink, Levallois-Perret (FR)

( * ) Notice: Subject to any disclaimer, the term of this patent is extended or adjusted under 35 U.S.C. 154(b) by 189 days.

(21) Appl. No.: 12/876,379

(22) Filed: Sep. 7, 2010

(65) Prior Publication Data

US 2011/0057511 A1  Mar. 10, 2011

(30) Foreign Application Priority Data

Sep. 8, 2009 (FR) ..................... 09 04293

(51) Int. Cl.
*H02J 1/10* (2006.01)
*H01J 3/38* (2006.01)
*H01J 7/34* (2006.01)

(52) U.S. Cl.
USPC ............... 307/18; 307/31; 307/112; 307/126; 307/131

(58) Field of Classification Search ............ 307/18
See application file for complete search history.

(56) References Cited

U.S. PATENT DOCUMENTS

| | | | |
|---|---|---|---|
| 5,359,540 A | 10/1994 | Ortiz | |
| 5,615,107 A | 3/1997 | DeAngelis | |
| 6,476,523 B1* | 11/2002 | Lee | .............................. 307/141 |
| 6,509,655 B1 | 1/2003 | Wang | |
| 7,132,763 B2* | 11/2006 | Rendic | .............................. 307/31 |
| 2003/0103304 A1 | 6/2003 | Rendic | |
| 2005/0007712 A1 | 1/2005 | Shim | |
| 2007/0297112 A1 | 12/2007 | Gilbert | |
| 2009/0146494 A1 | 6/2009 | Mori et al. | |
| 2009/0150509 A1* | 6/2009 | Chang et al. | .................. 709/208 |

FOREIGN PATENT DOCUMENTS

| | | |
|---|---|---|
| DE | 94 10 498 U1 | 9/1994 |
| FR | 2 902 943 A1 | 12/2007 |
| GB | 2 427 513 A | 12/2006 |
| WO | 2006/101683 A2 | 9/2006 |
| WO | 2007/135429 A2 | 11/2007 |

OTHER PUBLICATIONS

French Search Report, dated Jun. 26, 2010, from corresponding French application.

\* cited by examiner

*Primary Examiner* — Rexford Barnie
*Assistant Examiner* — Toan Vu
(74) *Attorney, Agent, or Firm* — Young & Thompson

(57) ABSTRACT

According to a first aspect, the invention relates to a device 1 for saving electric energy providing at least one override operating mode. With the invention it is possible to handle in a particularly optimized way the power supply of appliances such as for example video recorders, decoders, appliances comprising a rechargeable battery, computers, appliances entering the category of large or small electric domestic appliances. According to a second aspect, the invention relates to a configurable device, a system comprising such a device and a configuration method particularly suitable for allowing configuration by the general public of devices comprising at least one microprocessor and a non-volatile memory.

14 Claims, 12 Drawing Sheets

DEVICE FOR DISCONNECTING AT LEAST
ONE APPLIANCE FROM THE ELECTRICAL
MAINS, WHICH PROVIDES AT LEAST ONE
OVERRIDE OPERATING MODE, A
CONFIGURABLE DEVICE, SYSTEM AND
CONFIGURATION METHOD

TECHNICAL FIELD

According to a first aspect, the present invention relates to a device for which the main objects are to save unnecessary energy consumptions of at least one appliance and/or to reduce the risks of disasters related to the use of at least one appliance connected to the device. With the invention, it is further possible to extend the life time of the linked appliances. The invention more particularly relates to devices which provide at least one override operating mode relatively to the expected operating mode of an energy saver of the state of the art. According to a second aspect, the invention relates to a configurable device, a configuration method and a system comprising a configurable device according to the method.

It is provided that both aspects of the invention are considered to be independent and/or combined.

STATE OF THE PRIOR ART

The invention, according to a first aspect, discloses an energy saving device. Energy saving devices of the state of the art are known, they are arranged so as to automatically cut off the power supply of accessory appliances and, for a certain number of them, to also cut off the power supply of the so-called pilot appliance when the latter is in standby or stopped.

Such devices disclosed in patent FR0605627 (GILBERT) of the same inventor as well as more specialized versions for television sets such as in DE9410498 (MARSCHIK WERNER) or further so-called master-slave versions as described in US patent 2005/007712 (SHIM SANG-KEUN) are known.

Solutions exclusively based on the interpretation of infrared remote control codes are also known. The devices of the state of the art do not allow suitable handling of particular operating modes corresponding to cases of use in which the pilot appliance is temporarily not the one which is relevant for determining the behavior of the standby cutoff device. For example, known standby cutoff devices used in the surroundings of the television set impose the functional state of the latter as a reference for controlling the powering of the accessory appliances. By doing this, they do not provide a fully satisfactory solution in cases such as that of the use of a programmable device for recording television programs. The solution proposed by the standby cutoff devices of the state of the art is to connect programmable recording appliances such as a VCR or DVR to a permanently powered outlet. This is suitable when the recording device contains its own source of programs such as for example an on-board tuner. On the other hand, when the question is of recording a program, the source of which is external to the recorder, for example when the source is a Set Top Box connected to the cable, a decoder of encrypted programs, a satellite receiver casing, etc., the only solution is to also connect these appliances to a permanently powered outlet. The use of standby cutoff devices of the state of the art at the periphery of computers also poses problems notably for allowing remote maintenance operations for computer systems in a professional environment.

The solutions of the state of the art go against the intended goals with a standby cutoff device which are to save consumed energy and/or to reduce risks of fire of as many appliances as possible when these appliances are not used.

Casings such as ADSL BOXES, TV interfaces on IP etc., which are on the increase in the general public environment require waiting for a non-negligible period of time between the starting instant and the provision of the service. This waiting time considered as being long by the users is not very compatible with the use of a standby cutoff device of the state of the art.

Further, known standby cutoff devices are not adapted to controlling the power supply of portable appliances comprising batteries.

The solutions of the state of the art are unable to suitably handle the case of domestic electrical appliances in particular when requesting the starting of a deferred cycle as in the case of heating appliances.

It should be noted that the devices applying said at least one override operating mode relatively to the standard operating mode of a standby cutoff device depending on the state of the pilot appliance should be able to be installed, and optionally configured by the general public. Now, with the solutions of the state of the art for configuring, it is not possible to provide the required richness of configuration and simplicity of use at a cost compatible with the category of products in which the device according to the first aspect of the invention is located.

The invention, according to a second aspect, discloses solutions intended for users of the general public for configuring devices of any nature comprising at least one microprocessor and a non-volatile memory.

Devices which execute a configuration program and which handle the interaction with the user are known.

DISCUSSION OF THE INVENTION

According to the first aspect of the invention, the object is to at least find a partial remedy to the problems mentioned earlier by proposing a standby cutoff device laid out so as to provide at least one override operating mode relatively to the operation of a standby cutoff device of the state of the art which exclusively depends on the functional state of a main pilot appliance. By said at least one override operating mode it is possible to obtain from the standby cutoff device the sought additional functional capacity, for example in order to allow automatic recording of a television program, to allow updating of contents in accessory equipment, to allow remote maintenance, uploads/downloads of long duration in the field of computers or to obtain compatible operation with one or more appliances comprising rechargeable accumulators.

The invention may give rise to an application within the scope of a specialized standby cutoff device for such or such a type of application or appliances. The invention may also be applied within the scope of a universal standby cutoff device suitable for all types of appliances within a same field, for example for all the versions of audiovisual appliances or further for all computer versions and computer peripherals. The invention may also be applied within the scope of a standby cutoff device suitable for all types of appliances regardless of their functional domain, in particular a standby cutoff device suitable for the two most current domains which are the audiovisual domain and the computer domain. With the invention it is also possible to handle in a particularly optimized way the powering of devices such as for example video recorders, decoders, appliances comprising a rechargeable battery, computers, appliances entering the category of large and small domestic electrical appliances.

For more clarity in the discussion of the invention, the term of device will reserved for the technical objects according to the invention, the terms of appliance or equipment will be used for designating technical objects not specific to the invention.

The invention according to a first aspect, relates to a device for disconnecting the electric power supply of at least one appliance, said at least one appliance comprising at least one so-called main pilot appliance, the device comprising means for linking it to the electric mains, means for linking the electric power supply of said at least one appliance, at least one means for connecting and disconnecting the electric power supply of said at least one appliance, means for controlling the electric power supply of said at least one appliance in relation with the functional state of said at least one main pilot appliance and/or of a command for the user. Said device further comprises means for entering into at least one override operating mode relatively to the standard operating mode of a device which connects or maintains the connection of the electric power supply of said at least one appliance when said at least one main pilot appliance is operating and which disconnects the electric power supply of said at least one appliance when said at least one main pilot appliance is in standby or stopped. Said override operating mode leads the device to establish or to maintain continuously the connection to the electric mains of at least one appliance although said one main pilot appliance is in a standby or stopped functional state. Said device further comprises means for exiting said override operating causing a return to the operating mode where the electric power supply of said at least one appliance is disconnected when said at least one main pilot appliance is in standby or stopped. Only in the case of an override mode that establishes or maintains continuously the connection to the electric mains of at least one appliance although said one main pilot appliance is in a standby or stopped functional state, and where said at least one main pilot appliance has a constant power curve over the time, said means for exiting said override operating mode comprise an automatic exit consecutive to any change in functional state of said at least one main pilot appliance. The invention also encompasses a second category of override operating mode that leads the device to disconnect from the electric mains said at least one appliance although said at least one main pilot appliance is in a running functional state. By disconnecting the electric power supply is meant cutting off the flow of current between the electric mains and at least one terminal of the power supply of said at least one appliance in the case of a single-phase power supply. Said at least one appliance comprises at least one so-called main pilot appliance. The so-called main pilot appliance or group of appliances being alone or collectively the reference piece of equipment, the functional state of which is imposed to possible other appliances which are generally accessories cooperating with said main pilot appliance. A group of appliances collectively forming a main pilot appliance is for example a television set and a reader-recorder containing a hard disk. Thus, the power supply of the appliances is cut off if and only if the television set is in standby or off and the reader-recorder with a hard disk is in standby. Thus, the power supply of the appliance is maintained during the whole procedure for stopping the appliance with a hard disk. Said at least one appliance in the sense of the invention, comprises at least one appliance which, if it is alone, is then the so-called main pilot appliance. Said at least one appliance is most often external and distinct relatively to the device according to the invention, each entity being provided with its own casing. It is however provided in certain alternative embodiments that the device according to the invention is integrated into a pilot type appliance, for example in a television set, or in an appliance of the accessory type which provides at least one function other than those of the device.

The device further comprises means for linking the electric power supply of said at least one appliance. Advantageously there is a plurality of sockets technically dedicated to categories of appliances. Even more advantageously, the user is assisted for plugging in by markings and/or colors in relation with the sockets which are specific to categories of appliances. This being the case, there is no departure from the scope of the invention if at least one override operating mode according to the invention is applied within the scope of a device which does not differentiate the appliances by the sockets to which they are linked. There is either no departure from the scope of the invention in the case of a device which provides a smaller number of connectors than the number of appliances to be connected, or even which provides a single connector and which therefore requires resorting to multiple connectors for connecting more appliances than allowed by the connection means. There is either no departure from the scope of the invention when the device is integrated to an appliance and when the means for linking the electric power supply of said at least one appliance do not exclusively resort to connectors accessible by the user but these means are also at least part of the internal cablings.

In certain embodiments, it is provided that recognition of the appliances with view to their differentiation, in particular for recognizing the functional state of said at least one pilot appliance, is accomplished by recognizing at least one characteristic relating to the consumed power and/or further by at least partially recognizing remote control signals specific to the appliances of interest. By means for connecting and disconnecting the electric power supply of said at least one appliance is meant any active or passive electric switching means, the characteristics of which are suitable depending on the voltage of the electric mains, on the maximum power and on the nature of the loads to be switched. Electromechanical relays, the contacts of which are adapted to the loads to be switched are the preferred switching means considering their robustness and their capability of really insulating appliances from the electric mains when they are disconnected. This being the case, there is either no departure from the scope of the invention in the case of the use of switching means with semi-conductors such as triacs, GTOs, combinations of thyristors, IGBTs, MOSFETs.

By means for controlling the electric power supply of said at least one appliance in relation with the functional state of said at least one main pilot appliance and/or of a command from the user, are meant analog means and/or those based on wired or programmed logic for controlling switching means in order to power said at least one appliance when said at least one main pilot appliance is running and for cutting off the power supply when said at least one main pilot appliance is in standby or stopped. In preferred alternative embodiments of the invention, the power supply of at said at least one main pilot appliance is disconnected from the electric mains when it is in standby or stopped, this in order to maximize savings and to have said at least one main pilot appliance benefit from the advantages of the invention. At least in the alternative embodiments where the power supply of said at least one main pilot appliance is disconnected from the electric mains, the device requires a command from the user, the effect of which is to reconnect said at least one main pilot appliance to the electric mains. It is provided that the command of the user uses means specific to the device, for example a button dedicated to the device which may be on the actual device and/or as a remote control by wired or wireless means specific to the device. It is also provided that the command of the user uses means which are not specific to the device such as for example the infrared or radio remote control of another appliance.

By an override operating mode is meant any operating mode which does not correspond to the expected operation of a standby cutoff device of the state of the art relatively to the functional state of said at least one main pilot appliance. Application of the invention may for example lead to powering all or part of said at least one appliance while said at least one main pilot appliance is in standby or stopped. Conversely, in certain alternatives of the invention, application of the invention leads to cutting off the power supply of all or part of said one appliance while said at least one main pilot appliance is running. These two override modes apparently exclusive of each other may nevertheless be combined in certain alternatives of the invention, particularly sophisticated and/or configurable according to many options. In another alternative embodiment of the invention, overriding the expected operation of a standard standby cutoff device which does not differentiate the standby state from complete stoppage of said at least one main pilot appliance, relies on differentiation of both of these functional states. In other alternative override operation modes, the invention relies on the differentiation of several running states and/or standby states or further on the taking into account of events which are not directly in relation with the functional state of said at least one main pilot appliance.

It is provided that the device be laid out so as to provide at least one override operating mode which leads the device to establishing and maintaining connection to the electric mains of said at least one appliance although said at least main pilot appliance is in a stopped or standby functional state. This is a type of override, the most frequent use of which is provided in the field of audiovisual equipment, in particular within the scope of recording, updating microprograms, data relating to an electronic program guide or service guide (EPG or ESG respectively) and/or contents in peripheral appliances of said at least one pilot appliance as this will appear later on in the exemplary embodiments illustrating the invention. This type of override is also implemented in the case of electric domestic appliances which provide deffered cycle starting or cycle starting which is conditioned by switching to an advantageous electricity rate. Thus, the device according to the invention after having received a command for starting from the user, maintains the power supply of the appliance although the latter is in standby awaiting a starting condition.

It is provided that the device be laid out so as to provide at least one override operating mode which leads the device to disconnecting from the electric mains said at least one appliance although said at least one main pilot appliance is in a running functional state. This type of override meets needs which are most often found in the field of computer equipment although it may also for example meet needs within the scope of managing a pool of SET TOP BOXES of an operator. Professional use of energy-saving devices in large organizations is desirable for reducing operating costs, in particular of their pool of computers. This is being the case, energy saving devices of the state of the art do not allow remote maintenance operations such as software updates taking place out of periods of use of the workstation. The override operating mode solves this problem by cutting off the power supply of peripherals and accessories while the main pilot appliance remains running in order to await and/or successfully complete the maintenance operations. The computer switches to a standby mode upon completing the maintenance operations and, in preferred alternatives, its power supply is cut off by the device. Normal running which involves the powering of peripherals and running for the purposes of maintenance are differentiated by any means without departing from the scope of the invention. For example, the appliance transmits to the device via wired or wireless means a command indicating the state or a functional state change of said appliance, the device then adapts its functional state accordingly. It is also provided that the functional change of state of the device in view of the assumed one of said appliance be conditioned by an event not based on a communication between both of them. For example this may be a time event related to the counting of a duration or the coincidence with a time and/or calendar order configured beforehand. A case of similar use where said at least one pilot appliance is a computer concerns uploads/downloads of long duration using peer to peer protocols such as BITTORRENT during which only the central processing unit of the computer and the Internet connection means have to be imperatively powered, the power supply of the other peripherals may be disconnected. Upon completion of the upload/download operations, it is provided that the power supply of the main pilot appliance switches to a standby mode and that if possible it is cut off for maximizing savings. Certain electric domestic appliances such as for example an iron, are permanently on with periodic power requests for maintaining the temperature of the sole at the set temperature value. An override operating mode of the device is provided in order to suitably discriminate the operating mode during use for which the power supply has to be maintained, from the quiescent operating mode for which the power supply has to be cut off after a given period of time in this state.

It is provided that in certain alternative embodiments that the device according to the invention does not comprise any means for measuring the consumed power by at least one pilot appliance and that the functional state of said at least one pilot appliance is known to the device according to the invention via commands which are sent to it and/or via any other means capable of determining the functional state of said at least one pilot appliance.

It is provided that the device is applied in a decentralized form comprising at least two casings which each further comprise means for linking to the electric mains and means for bidirectionally or unidirectionally transmitting information to at least one other of said casings.

The device according to the invention is most often applied in centralized form grouping technical resources in a same casing linked through a single plug to the electric main. It is also provided that the device should be applied in a decentralized way. By a decentralized application of the device is meant the distribution of means in at least two casings. Each casing comprises a link to the electric mains and additional means for transmitting to at least one other casing of the same decentralized device, information required for operation according to the invention. It is provided that the transmission of information between the casings be based on the use of means without any additional wires such as radiofrequency means, means using infrared radiations or further through power line communication which do not require wires in addition to those which are required for the electric powering of the casings. It is provided that this refinement of the invention be applied for example in order to extend the linking capacities of the device to appliances which are distant from each other without requiring the use of cable extensions. Another exemplary application of the invention in a decentralized form relates to its application to lighting. It is thereby possible to globally handle automatic extinction of a plurality of distinct standard lighting points, each lighting point being possibly provided with its own individual control means, starting with the extinction of one of the sources belonging to this plurality. This alternative device according to the invention is advantageously completed by means for switching on, or even optionally for adjusting the intensity of the lighting, the plurality of lighting sources from switching on one of the sources belonging to this plurality or handling a control thereof.

It is provided that disconnection of the electric mains from at least one appliance be further determined by the detection or absence of detection for a time determined beforehand, of an event without any direct relationship with the functional state of said at least one main pilot appliance.

By an event without any direct relationship with the functional state of said at least one main pilot appliance, is meant any event, the source of which is external to the appliance or the source of which is in relation with the main pilot appliance but which is not directly related to its power consumption.

For example, this is the automatic disconnection of an electric domestic appliance by the device, when it detects a water leak although said at least one main pilot appliance is running. In this example, said at least one appliance, the power supply of which is intended to be cut off, comprises at least the main appliance which generally contains at least one solenoid valve and a drainage pump, for which cutting-off the power supply is likely to suppress the cause of the water leak. An additional solenoid valve mounted on the water inlet tap at the outlet of which the incoming water supply of the electric domestic appliance is advantageously linked, completes the installation as an appliance for reinforcing the safety of the installation. Within the scope of other applications of the invention, it is provided that it is the non-detection of an event for a determined time which causes automatic disconnection of at least one appliance. For example in the case of an iron, this may be disconnection of its electric power supply when information from the motion sensor integral with the appliance is no longer received by the device during a determined time. For alternatives of the device according to the invention adapted to other types of appliances, the invention makes provision for utilizing information from a presence sensor. The question may also be monitoring the state of an indicator lamp or an appliance with a suitable sensor such as a photodiode, a photoresistance or a phototransistor. In this case, the switching on or off of said indicator, depending on the alternative of the device or its configuration, is the event in the sense of the invention. For example the device by means of a probe equipped with the suitable sensor, may automatically disconnect from the electric mains a power line communication modem when its indicator lamp indicating the establishment of a connection with a remote modem is continuously off for a time determined beforehand.

It is provided that the device further comprise measurement means giving representative information on the consumed power by said at least one main pilot appliance and means for determining the functional state of said at least one main pilot appliance, by comparison between said information and at least one first threshold determined beforehand, or from the measurement of the duration during which the power consumed by the main pilot appliance is greater than or equal to a first threshold determined beforehand and/or from the measurement of the duration during which the power consumed by the main pilot appliance is less than a first threshold determined beforehand.

The power consumed by said at least one main pilot appliance may be measured or estimated from the measurement of the current required by the thereby formed load. The current measurement may be conducted by any usual means such as a voltage measurement at the terminals of a low value power resistor, further called a shunt, which may possibly be limited in power by mounting two diodes anti-parallel to its terminals. The current measurement may also be accomplished by means of a current transformer, a Hall effect sensor, a Rogowski coil or by any other means without departing from the scope of the invention. The threshold determined beforehand may have been subject to a preliminary learning phase with storage in memory of the results obtained by a calculation from the result of one or more measurements. The threshold may also be determined beforehand by an adjustment carried out at the factory or by the user on the device by means of a potentiometer, by selecting an adjustment position provided by discrete means such as a switch with several positions, by a "plus" button and a "minus" button, etc. The threshold determined beforehand may be in relation with an adjusted or stored absolute value or further this may be a relative value with respect to a previous measurement. These measurements may further be conducted during one or more durations which are themselves determined. For example, the standby state may be assumed to be detected if the average power continuously consumed by the load during a determined duration becomes less than one third of the previously stored value as having the highest average value continuously consumed during a duration which is also determined. By measurement of the consumed power should be understood any real measurement or at least any evaluation of the current flowing in the relevant load. By evaluation is meant any approximate measurement which is insufficiently accurate, linear, independent of the wave form or which is marred by any other defect preventing one skilled from describing it as a measurement in the conventional sense of electrical engineering. Said evaluation is nevertheless sufficient for being at the basis of a perfectly functional application of the invention.

There is no departure from the scope of the invention if, as in the case of the main pilot appliance, the secondary pilot appliance is further formed with an appliance connected in parallel on the electric power supply means provided by the device according to the invention.

It is provided that for appliances which are always on such as an iron, a suitable alternative device according to the invention determines the functional state of the appliance by a time measurement. For example this may be the time during which the power consumed by the appliance is greater than or equal to a threshold determined beforehand, and/or of the type during which the power consumed by the appliance is less than a threshold determined beforehand. All the categories of measurements of durations enter the scope of the invention; this may be a measurement of absolute time from a clock or from the counting of arbitrary time units specific to the device or to the electric mains. The measurements related to the duration of the phase during which the power consumed by the appliance is greater than or equal to the threshold determined beforehand or of the phase when the power is less than the threshold. The durations during both phases may also be used as a combination by the device without departing from the scope of the invention. These may also be measurements of relative durations of the phases relatively to each other, i.e. of the heating duty cycle in the case of heating appliance.

It is provided that the device further comprises means for linking and for permanently powering at least one appliance.

It is advantageous if the device comprises means for linking at least one appliance requiring a permanent power supply, indeed certain appliances such as for example programmable recorders or decoders provided for storing digital contents out of viewing periods require power supply continuity.

It is provided that the device further comprise measurement means giving representative information on the power consumed by said at least one appliance, said at least one secondary pilot appliance, means for determining the functional state of said at least one secondary pilot appliance by comparison between said information and at least one second threshold determined beforehand, means for powering at least one other appliance when the power consumed by said at least one secondary pilot appliance is greater than or equal to a second threshold determined beforehand regardless of the power consumed by said at least one main pilot appliance, and for cutting off the electric power supply of at least one other appliance when the power consumed by said at least one secondary pilot appliance is less than a second threshold determined beforehand and when the power consumed by said at least one main pilot appliance is less than a first threshold determined beforehand.

It is provided that the device further comprise means for linking at least one so-called secondary pilot appliance always supplied with electric power via the device, said device being laid out so as to control the electric power supply of at least one of the other linked appliances depending on the functional state of said secondary pilot appliance. In this particularly preferred alternative, the question for example is of linking a programmable recording appliance depending on an internal calendar clock or further of linking an appliance connected to a network which itself manages and/or in cooperation with remote resources also connected to said network, its own functional state changes. Typically, this is the case of a video recorder of the VCR or DVR type which by time programming, by self-learning or by any other means, should be continuously powered so as to be itself able to manage its changes in functional states such as standby, recording and possibly reading. This may also be a Set Top Box connected to at least one server via a broadcasting network and/or a telecommunications network. The Set Top Box may itself handle its changes in functional states by taking account of information received from the network such as for example the beginning of the end of an operation for transferring audiovisual contents into a memory of the Set Top Box or further into a storage memory associated with the Set Top Box such as a memory card, an external hard disk, a portable reader-recorder, etc. This may also be the beginning or the end of an operation for transferring a microprogram for example for updating embedded software in the appliance, this may also be an operation for collecting information stored in a memory of the appliance for purposes of statistics, audience measurement, request for multimedia contents, etc.

The invention may also be used under the assumption of a combined appliance comprising the functions of a main pilot appliance such a television set and functions of a secondary pilot appliance such as recording functions either standalone or connected to a network. In this case, the combined appliance should be linked to the means of the device according to the invention which are provided for powering the so-called secondary pilot appliance.

In certain particularly refined alternative embodiments of the invention, the means for linking and for permanently powering at least one appliance are configurable in order to allow the linking of at least one secondary pilot appliance or of at least one appliance, the functional state of which has no effect on the other appliances linked to the device.

In certain particularly preferred alternative embodiments of the invention it is provided that said at least one other appliance for which the question is to control its electric power supply depending on the power consumed by said at least one secondary pilot appliance does not comprise at least one main pilot appliance.

At the cost of adding at least one additional switching means such as a relay, the override operating mode only relates to the powering of appliances comprising all or part of the accessories such as for example receivers or decoders. Said at least one main appliance such as a television set remaining unpowered while all or part of the accessories are powered within the scope of the override operating mode.

It is provided that the device according to the invention further comprise means for receiving and for interpreting at least one command in relation with the override operating mode.

It is provided that a command from the user in relation with override operation be either direct, for example by pressing on a button of the device, or indirect by receiving a command transmitted by an external piece of equipment. Said external pieces of equipment are for example a remote control specific to the device or a remote control associated with another piece of equipment, the signals of which may be either entirely or partly used by the device, after if need be, a learning or configuration phase, executed in the device and/or in the remote control. The same applies for the command coming from an external automatic system which may be based on a specific connection with the device according to the invention or on the use of generic means such as reproducing at least one remote control code which is interpretable by the device. For example this is the case when using a recorder provided with an infrared emitter of the <<IR blaster>> type or one or more occasional infrared emitters to be placed in proximity to appliances to be controlled. It is provided that notably in the case of a computer peripheral use, the device may receive simple commands and/or enriched with at least one parameter such as a duration or any other quantity capable of modifying the operation of the device. Solutions minimizing the costs on the device side will be preferred. Thus, commands emitted by an appliance may use means comprised in the appliance such as an IrDA port or low cost accessories, for example an infrared emitter which may be connected to a USB port, a simple light source which may be connected to a computer port and inserted into a housing of the device provided for this purpose, a small accessory which may be connected to an audio output, etc.

The direct and indirect commands may affect entering and/or exiting the override operating mode without departing from the scope of the invention. These commands may comprise one or more parameters if necessary, without departing from the scope of the invention.

It is provided that the device according to the invention further comprises means for handling at least partly automatically entering and/or exiting the override operating mode.

The events in relation with the override operating mode of the device which for example are entering and/or exiting this mode may result from the expiry of a timeout, from the coincidence with a given instant. They may also be in relation with the detection of information from a sensor or further be associated with a power measurement in a predetermined range of at least one of the appliances linked to the device among said at least one main pilot appliance, said at least one secondary pilot appliance if necessary or at lest one other appliance.

Exiting the override mode may also be automatic, for example after the device according to the invention has observed a cycle for starting the main pilot appliance followed by standby or stoppage of the latter. This refinement avoids that forgetting to voluntarily exit the override operating mode on behalf of the user leads to significant savings losses or to exposure to a risk or fire of unlimited duration. Any other command not specifically associated with exiting the override mode may be used for reaching the same result without departing from the scope of the invention. For example, after the device has been placed in an override operating mode, any subsequent command received by the device will cause it to exit this operating mode, possibly on expiry of a timeout in order to leave time to the user for replacing the device in the override operating mode before any change in state of the appliances, if this command for exiting the override operating mode was accidental.

Exiting the override operating mode may occur by any means without departing from the scope of the invention. This may for example be a command emitted by the appliance and received by the device, this may also be an override operating mode for a duration determined beforehand, for example during a configuration step or by receiving a command with a parameter. It is provided that the at least partly automatic handling means relate to entering and/or exiting the override operating mode.

It is provided that the device according to the invention further comprises a real-time clock and/or a time counter.

Most often this is a particular case for handling at least partly automatically the override operating mode wherein entering and/or exiting the override mode is carried out automatically over time. It is possible to handle this automaticity from a real-time clock comprised in the device for handling operation depending on the time and/or on the actual date. In many cases, it is not necessary to apply a real-time clock which represents additional expenditure and requires adjustment. Simple time counting based on an internal clock or on pulses from the power supply on the electric mains for example gives the possibility of starting said at least one appliance in advance relatively to the need and recurrently for example every 24 hours.

This automatic override mode, for example, aims at powering equipment with long starting times while anticipating the need of the user so that the latter is able to start them instantaneously when this is desired. This override operating mode is particularly suitable for handling casings such as ADSL BOXES, TV interfaces over IP etc., which required a non-negligible waiting time between the starting instant and the provision of the service. For daily users of a computer, for which the booting time of the operating system is relatively long from power-up, the automatic starting mode via the device according to the invention is particularly advantageous. This is especially so if the operating system and the hardware of the computer enable automatic management of a standby mode. Thus, it is possible to parameterize the BIOS of the computer so that it automatically starts on power-up which is automatically handled while anticipating the need of the user by the device according to the invention. The computer, after having booted its operating system, in the absence of use for a time determined beforehand in its adjustments will automatically switch to a <<hot>> standby, i.e. the computer will immediately be ready to operate as soon as an input device is actuated by a user, and the other appliances will advantageously be disconnected in the alternative embodiments of the device where the powering of said at least one main pilot appliance is handled separately from that of the other appliances.

Switching to the active mode of the computer which is associated with the powering of said at least one other appliance by the device may be arbitrarily ordered upon a real-time or counted-time event but it may also be detected by any means in relation with the device, for example by detecting the crossing of a second power threshold determined beforehand relatively to said at least one main pilot appliance, by the device noticing variations in the power consumed by the computer which for example reflects activity of the hard disk which is associated with the running condition. Other means which do not take into account the power may be used such as detection of the presence of a voltage level on an input/output port, detection of the operation of a fan, etc.

There is however no departure from the scope of the invention if the real-time clock and/or the time counter is used for changing the functional state of at least one appliance either connected or not to the device via means for controlling its electric power supply and/or added wireless means for transmitting commands to it. Provision is also made for using a real-time clock and/or a time counter in the device in order to handle deferred starting of appliances.

It is provided that the device further comprises means for signaling override operation.

In the alternative embodiments of the invention which provide a standard operation mode and at least one override operating mode which is an abnormal operating mode in the literal sense, it is useful to inform the user when the device operates in the override mode. Indeed, in a number of alternative embodiments of the invention, the override operation may be assimilated to an abnormality with respect to normal operation. The user should therefore be reminded that this is not a failure of the device but a special functional state but nevertheless normal in view of a particular context. Provision is made for using a dedicated indicator comprised in the device or further allocating a particular signaling mode of an indicator with multiple meanings. For example this may be a blinking rate and/or a color specific to the override operating mode of the device.

It is provided that the device further comprises means for linking and for suitably handling at least one portable appliance comprising a rechargeable standalone energy source.

This means providing in the device according to the invention, one or more dedicated or configurable sockets for powering chargers for appliances containing a rechargeable energy source. This type of connector, which is powered when those which are dedicated to the appliances are powered, may further be powered alone, automatically, periodically, or for a certain time, when neither a possible secondary pilot appliance nor the main pilot appliance are running. This specific behavior may obey more or less sophisticated algorithms either taking into account or not the current requested by the charger. The sought purpose is to ensure a proper charged condition of the rechargeable energy source on-board the portable appliance while not leaving the charging means permanently powered. This is still actually an operating mode which overrides the operating mode of a standby cutoff device of the state of the art.

It is provided that the device further comprises means for transmitting commands, with no added wires, to at least one piece of equipment.

In an advanced alternative of the device, it comprises infrared emission means for essentially controlling the starting and/or standby of at least one piece of equipment which is not necessarily connected to the device.

In a particularly advantageous embodiment, the device further ensures a function for translating infrared commands in order to convert commands received by the device from a first remote control into remote control signals intended for a piece of equipment which does not understand the signals from the first remote control. The characteristics of the remote control signal emitted by the device result from a preliminary learning step from the native remote control of the piece of equipment to be controlled and/or from a preliminary configuration step wherein the characteristic information of the remote control signals to be emitted stem from a database after having indicated one or more identification elements of the appliance to be controlled. The selection of the activation and/or of the associations between the commands received by the device from said first remote control and the commands sent by the device are advantageously subject to a suitable configuration step.

Still more advantageously, the piece of equipment to be controlled by commands emitted by the device is linked to one of the sockets of the device having available a representative measurement of the power consumed by the load which is linked to it, the device may check whether the starting and/or standby of the piece of equipment is effective and if necessary repeat the sending of the command.

According to the second aspect of the invention, the question is of finding at least one partial remedy to the problems mentioned earlier by proposing a configurable device, a configuration method and a system, comprising a configurable device, in order to apply the method according to the invention.

Like in the discussion of the first aspect of the invention, for more clarity, the term of device will be reserved for technical objects according to the invention, the terms of appliance or equipment will be used for designating technical objects not specific to the invention.

It should be noted that the second aspect of the invention may advantageously be applied to the particular case of the device according to the first aspect of the invention. Indeed, the application of the invention according to its first aspect in its most sophisticated alternatives is confronted with the problem of the difficulty of the lack of a sufficiently rich man-machine interface in order to be able to configure the device in a way which may be explained, understood and applied for and by the general public not having a technical education.

This being the case, the second aspect of the invention is intended to more generally apply to any device comprising at least one microprocessor and a non-volatile memory regardless of the type, the category and the field of the device. The problem solved by the solution according to the second aspect of the invention is common to most small electronic devices which do not comprise a man-machine interface capable of allowing the user to completely and/or simply configure the device according to methods from the state of the art. This aspect of the invention is particularly suitable for devices which are subject to constraints on cost and/or dimensions and/or electric safety. The devices according to the first aspect of the invention are subject to these constraints but the same applies to most electrical appliances intended to be connected to the alternating low voltage electric network or to a very low DC voltage network, to appliances powered by standalone means, to equipment fitting out buildings or vehicles, gadgets, toys, etc. It is however provided in the invention that its application may coexist with the presence of means for autonomously configuring at least one functional characteristic among the most necessary and/or the simplest to be configured with limited on-board means.

The second aspect of the invention is also suitable for devices of any nature, of medium complexity, which comprise means for configuring at least one part of the options and functional alternatives of the device. By applying the invention, it is possible to facilitate configuration as a whole, but also optionally, to reach a greater depth in the adjustments of parameters and functional options.

Paradoxically, the second aspect of the invention is also suitable for sophisticated electronic devices which take means on-board allowing a well-informed user to fully configure them. The advantage of the invention in this case is to allow users without any technical knowledge to configure complex devices in a simpler way. The second aspect of the invention further provides the possibility of using configuration profiles prepared beforehand by third parties. The user then just has to transfer at least one piece of configuration information of his/her choice into the device via a general public appliance easy to find and to handle, such as for example a computer, a television set, a telephone, a portable media player, etc. The second aspect of the invention also provides the possibility of entrusting third parties, machines or humans, locally or remotely, with the preparation of the configuration of their device according to their preferences, the user just having to transfer the configuration information into the device via the usual means.

The second aspect of the invention, which is capable of solving problems which are posed in the field of general public products and users, is also capable of solving similar problems in the field of professional products and/or users since by applying the invention it is possible to reduce the hardware and human costs as compared with solutions of the state of the art.

The invention according to its second aspect relates to a device comprising at least one microprocessor and a non-volatile memory, said device further comprising means for receiving at least one piece of information in relation with its configuration, said at least one piece of information being emitted by an external piece of equipment.

Said pieces of information are advantageously information relating to the configuration of the device, i.e. relating to selections of functional options provided per device. Of course, there is no departure from the scope of the invention if said pieces of information are not exclusively related to the configuration but for example are commands with optionally one or more parameters. The question is of using rich interaction means provided by equipment equipped with an advanced man-machine interface such as for example a computer or a television set optionally completed by a suitable Set Top Box for preparing the configuration of the device. The means potentially provided by these equipment may resort in a non-limiting way to images, videos, cartoons, sound, text, with sophisticated possibilities for browsing the information, to contextual selections consecutive to the selection of a device to be configured, and/or to cases of use among a plurality of them and native capability of handling multilinguism allowing the preparation of the configuration of the device in a way adapted to users of the general public without notably increasing the cost of the device to be configured. A piece of information resulting from the configuration choices is transmitted to the device. The latter stores all or part of said information, if necessary after transformation, in a non-volatile memory. The operation of the device, if necessary after restarting, occurs according to the new configuration choices. The external means may be used in order to propose to the user, unit choices and to then transfer the result of the latter into the device. The external means may also be used for transmitting to the device a configuration profile established beforehand depending on a given case of use or further depending on a type of equipment selected by the user such as for example in the case of the use of a Set Top Box of a given operator. Just as in the case of the transmission of commands as described earlier, the means for transmitting the information from the external equipment to the device may be of any nature without departing from the scope of the invention. These may be wired means equipped with coupling elements providing galvanic insulation when the electronics of the device is not insulated from the electric mains. Any port for connecting to external equipment may be used, for example a USB port. Transmission solutions using power line communication may also be used. The transmission means may advantageously use wireless techniques for reasons of electric safety. These may be infrared means which provide the advantage of being able to reuse the infrared receiver probably already comprised in the device for receiving the remote control signals. For example, it is possible to reuse the IrDA port of a computer which is equipped with one, in order to transmit information which may be received by an infrared receiver provided for receiving remote control signals. The wireless means may also be proprietary radio means or compliant with standards such as WiFi, WUSB, ZigBee etc. It is provided that the device uses said information in relation with an external piece of equipment in order to infer its functional state therefrom, said information may be obtained from the piece of equipment by connecting a plug in relation with the device to at least one of its available input/output ports. The information may be obtained by means of at least one sensor in relation with the device, the sensor being placed in contact with a portion of the equipment or in its close environment.

In a particularly preferred alternative, it is provided that the pieces of information received by the device are transmitted via means at least partly capable of reproducing sound in relation with an external piece of equipment.

This is for example transmitting information to the device by using the sound output, a loudspeaker or an earphone in relation with a computer, a television set, a Set Top Box, a portable media player or any other appliance capable of converting information into sound as a transmission means within the scope of the invention. In a particularly advantageous alternative embodiment since it only requires communicating and interconnected pieces of equipment of current use, and allowing their use in any worldwide location, a telephone may be used as a sound reproducing means. The telephone is remarkable in that interoperability is effective regardless of the applied technology, either wired or wireless, switched or VoIP technology. The telephone further provides the advantage of allowing production of configuration information while interacting with the user by means of a voice server which at this stage is aware of the version of the device, may specifically tell the user where the sensor is located on which the earphone of the handset is to be applied. Indeed, the microphone allowing the device to capture audio frequency signals from the telephone may be located in multiple locations such as for example under the main casing or under a remote control casing if necessary.

It is provided that any type of sound modulation may be used without departing from the scope of the invention. In order to simplify the application in the device and to reduce the costs, a very high throughput is possible considering the small amount of information to be transmitted. Thus, the use of modulation types such as DTMF or even simpler types like FSK applying two discrete frequencies used alternately or even an ASK type modulation using a single carrier frequency in the audio telephone band is provided within the scope of the invention.

In a certain alternative embodiment, it is provided that with a first portion of the transmitted information the device may calibrate the frequencies and/or durations so that it may distinguish the various logic states required for interpreting the information. Provision is made for transmitting the information asynchronously according to standard UART type methods but provision is also made for efficiently transferring in a very simple and robust way a series of numbers associated with variable coding behaviors and/or values of parameters interpreted within the device, by means of a succession of pulses. The information fields are shown in a predetermined order within a frame, the beginning and/or end of which is signaled for example by a stable state during a period of time longer than or equal to a minimum value. In a preferred alternative embodiment, each piece of information is handled autonomously with its own delimiter and label, which allows emissions limited to the strict amount of required information which has the advantage of limiting the duration of the emission step and limiting the risks of transmission errors. It is provided that the end of the information transfer sequence may be detected by the device by any means, for example indirectly after having received the expected number of information fields within a given time or directly by detecting a piece of information coding the end of the transfer sequence such as a stable state with a duration longer than that coding the end of an information field. It should be noted that the invention provides that the transducer ensuring the interface with the device and which is connected to an output of the external equipment which is normally intended for reproducing sound information may be incapable of reproducing the sound. This may for example be a LED with simple adaptation electronics for transferring the information to the device by optical coupling. The device comprises in this case an optical sensor having a suitable wavelength. The transducer may also be for example a coil allowing the information to be transferred to the device via magnetic coupling. The device comprises in this case a coil and suitable electronics.

In a particularly elaborate alternative of the invention, provision is made for both using the earphone output and the microphone input of a computer for making a bidirectional interface with the device which reuses the standard chain for decoding, optionally encoding, and handling audio contents.

Regardless of the receiving means applied in the device, in the case of a unidirectional transmission method, it is provided that an error detection code be added to the information useful upon emission in order to allow the device to detect a transmission error, not to take into account corrupted information and/or to signal the problem to the user for example by specific blinking of an indicator lamp so that he/she begins the information transfer procedure again.

It is provided that advantageously, the means applied for receiving information emitted via means at least partly capable of reproducing sound in relation with an external piece of equipment be further capable of emitting sounds.

It is particularly advantageous to use a reversible transducer for applying the invention. The use of reversible transducers such as for example a piezoelectric transducer or an electrodynamic loudspeaker allows reception of sound information transporting said at least one piece of information relating to the configuration of the device while providing the device within the scope of its operation, and with low or inexistent additional expenditure, the possibility of emitting sounds such as beeps. A buzzer is often applied in small appliances in order to complete the generally limited user interface. When the device requires a buzzer for its own operation, then the application of the configuration solution according to the invention may be accomplished without any additional expenditure for example by controlling a piezoelectric transducer by a microcontroller pin which may be utilized according to the software instructions at the digital output or at the input of an analog/digital converter.

It is provided that the device further comprise an acoustic coupling part having a face capable of being placed in contact with a wall or a bore capable of receiving an earphone.

An acoustic coupling part made in a flexible material such as dense foam or an elastomeric material is laid out so as to provide a planar surface capable of creating a contact, relatively soundproof to outdoor noises, with a wall such as the pierced wall of a telephone handset from where the sounds are emitted. This planar surface may further act as a skid which does not scratch the setting surface under the lower face of a casing. Said coupling part further comprises a bore with a diameter allowing a standard earphone to be inserted and held in an acoustic coupling position by tightening due to the elasticity of the material and to the bore diameter which is slightly less than the outer diameter of the earphone.

In another alternative, it is provided that the information received by the device be emitted via means at least partly capable of reproducing images in relation with an external piece of equipment.

The question for example is to transmit information to the device by using the screen of a computer, of a television set or of any other appliance comprising a light emitting screen as an emission means. The user is invited to place all or part of the device comprising at least a visible light sensor on an area of the screen. Advantageously provision is made for modulating the luminosity of the pixels according to two extreme states corresponding to 0 and 100% of luminosity of the pixels of the emission area. The invention provides that the visible light sensor be capable of directly discriminating two states of luminosity from each other of the emission area. Any type of coding may be contemplated without departing from the scope of the invention as well as the transmission methods described earlier within the scope of using sound for conveying the information. For example, it is possible to code several logic states as a function of the illumination duration of the emission area. Provision is also made for discriminating a logic zero and an information field end depending on the extinction duration of the emission area. Advantageously, the visible light sensor is laid out so as not to be strongly illuminated during normal use, this goal being reached by placing said sensor under a casing. The addition of a colored filter in front of the sensor is advantageous in order to increase immunity towards illumination sources present in the surroundings during normal use. Provision is made for improving the rejection of parasitic signals by filtering the signal from the sensor in the time domain in order to exclude all or part of the signals outside the useful frequency band. This time-filtering is carried out in the digital domain and/or in the form of time constants applying at least one capacitor in the interface of the sensor. Provision is made for using a diffusing material or a surface treatment for achieving merging of the unit contributions of the pixels of the emission area and/or integration of the light contribution of several lines in the case of a raster screen. The suitable light sensor for applying the invention may for example be a phototransistor, a photodarlington, a photodiode, a photovoltaic cell, a photocapacitor or a photoresistor. The interface of the sensor comprises means for directly discriminating two logic states from each other in relation with at least two illumination levels. For example this may be a simple comparator, a Schmidt trigger. The invention allows an economical application by direct connection of the sensor to an input of a microcontroller, for which the characteristics for associating reading of a logic state depending on the input voltage and if necessary the presence of a current source imposing a default logic state are exploited.

It is provided that all or part of the configuration of the device be prepared from an external piece of equipment, distinct from said device, said external piece of equipment being capable of interacting with the user, the information in relation with the configuration being transmitted by a piece of equipment external to the device storing it, possibly after transformation, in a non-volatile memory, the device adapting all or part of its functional characteristics accordingly.

The preparation of the configuration, in the form of one or more steps, advantageously resorts to multimedia means. The steps for preparing and/or emitting information to the device may be based on a program executed in a computer, in an advanced television set, or in a Set Top Box linked to a standard television set. These same operations may also be executed on a server connected to Internet and are remotely performed in equipment provided with a screen and a standard browser. It is provided that the preparation of the configuration may be globally accomplished for all the functional options of a given device version according to the invention. It is also provided that the preparation of the configuration only deal with subsets of functional options and/or with a given option. Each preparation step whether it is global, per group or per unit, is followed by a step for transmitting the corresponding information to the device.

It is also provided that standard configurations be prepared prior to their use, for example by the manufacturer of the device and made available to the users for example on a website. These configurations are embodied as data files of any types in particular of data coding downloadable audio or video contents depending on whether the device applies receiving and execution means in relation with sound and/or images. It is further provided that configuration may be globally accomplished for all the selections and parameters of the device before transmitting to the device the whole of the associated information. In a preferred alternative, configuration is handled on a selection basis and/or adjusted by an adjustment allowing actions of unit configurations or configurations per selection subsets and/or adjustments according to the needs of the user at a minimum level of complexity. To do this, the information comprises self-contained unit blocks which are structured so as to allow identification of each block in order to associate the data of the block with said at least one corresponding variable of the device.

It is provided that the device further comprise means for autonomously configuring at least one of its functional characteristics.

Although the invention may be applied in the device for entirely configuring its functional options, it is advantageous to further provide hardware and logic means so that the user may configure the most important functional option(s) within the scope of the use of the device. In preferred exemplary embodiments of the invention, all the options and all the values for adjusting the operating parameters are configurable according to the invention. These means are completed with self-contained means providing the advantage of not requiring any third party equipment but only allow configuration of one or two basic parameters, indispensable for operating the device. If necessary, the self-contained configuration means provide a more reduced adjustment possibility, for example according to two states, this same parameter providing more adjustment possibilities by the application of the invention.

According to the second aspect of the invention, a method is provided for configuring any device comprising a microprocessor and a non-volatile memory. It is also provided that this method be applied in a device according to the first aspect of the invention. This method comprises the following steps:
    a step for preparing said at least one piece of information in relation with the configuration of the device, this step being executed from the resources of a piece of equipment, distinct from said device, said piece of equipment being capable of interacting with the user; and
    a step for emitting at least one piece of information in relation with the configuration of the device by a piece of equipment which may coincide with, or be distinct from, the one having executed the configuration preparation step; and a step for receiving by the device at least one piece of information in relation with its configuration; and a step for storing in a non-volatile memory of the device all or part of said at least one piece of information in relation with its received configuration, after partial or total transformation if necessary; and a step for executing the functions of the device applying all or part of said at least one piece of information in relation with its received configuration, after partial to total transformation if necessary.

The configuration method according to the invention aims at first solving the following technical problem: provide many possibilities for selecting functional options, adjustments, parameterizations of a device, without notably increasing its cost, the solution according to the invention should not further require specific additional means or particular skills for applying it.

The method according to the invention provides a novel and inventive solution to this problem. The first step relates to preparation of the configuration, i.e. make selection of functional options, of adjustments, of parameterizations of any types, within a set of possibilities which may be defined in relation with a given type of device, a given brand of devices, with a given range of devices or with one device in particular. It is provided that said at least one piece of information relating to the configuration of the device resulting from the configuration step should be directly exploitable and in totality by the device in the case when the means applied during the preparation step have been informed on the exact references of the device to be configured. It is also provided that in other alternative embodiments only part of said at least one piece of information produced in the preparation step be used by the device and/or that the latter express all or part of the information before using it.

In the method according to the invention it is provided that the execution of said preparation step and/or of said step for emitting at least one piece of information relating to the configuration of the device further comprise a step for identifying said device.

In the invention, it is provided that the preparation step comprise a step for identifying the device to be configured. This step advantageously is the first within the preparation step, in order to if necessary adapt the selections and/or the provided adjustments to those which are actually exploitable by the designated device. The identification of the device may be accomplished by any means, for example by selecting the device in a list, optionally in a tree structure. This may also be an input of the brand and of the version of the device or further the input of a sequence of numbers of the identification code of the product on its package for inventory management purposes, for example the sequence of numbers associated with a bar code. Any type of input device may be suitable for successfully performing this operation, keyboards of any types: a standard computer keyboard, a virtual keyboard on a touchscreen, a keyboard of a telephone or of a remote control, etc.

In a preferred embodiment, the appliance used is a telephone which proposes the interaction by voice synthesis and recognition; if the telephone is equipped with a camera, identification of the device is provided by taking a snapshot of the barcode or its front face on which the brand and the reference of the version are written. Suitable image recognition software packages are locally or remotely implemented as well as a database for automatically proceeding with the identification step.

In the method according to the invention, it is provided that the execution of the step for emitting at least one piece of information relating to the configuration of the device be conditioned by the execution of a preliminary step for explicitly requesting emission of said at least one piece of information relating to the configuration of the device.

It is provided that in the case of an application of the method according to the invention, in which the preparation step is performed interactively with view to directly emitting towards the device to be configured, said at least one piece of information, that the emission step be executed after the user having explicitly ordered the emission, for example by pressing on a button.

In the method according to the invention, it is provided that the step for emitting said at least one piece of information relating to the configuration of the device and the step for preparing the configuration, be automatically executed as a loop and that said at least piece of information relating to the configuration of the device be automatically updated accordingly.

It is provided that in the case of another alternative embodiment of the method which is interactive for directly emitting towards the device to be configured said at least one piece of information, the emission be repeated in a loop. It is also provided that said at least one piece of emitted information be continuously updated depending on the adjustments in progress. This amounts to successively executing in an endless loop the preparation and emission step, this until the user terminates the configuration session.

In the method according to the invention, it is provided that the step for emitting said at least one piece of information relating to the configuration of the device is associated with reading sound and/or visual information intended for the user.

In a preferred alternative embodiment, it is provided that the additional capabilities of reproducing visual and/or sound information of the appliances applied for executing the step for emitting said at least one piece of information relating to the configuration be used for bringing information to the user. By information is meant for example a voice description of the options of the associated configuration, information guiding the user in the configuration operation and/or in using the device and/or the appliance for configuring it, information with a promotional or advertising nature, etc. For example, when an appliance provided with a capability of reproducing stereophonic sound is used for emitting at least one piece of information relating to the configuration on one of the channels, the other sound channel may advantageously be used for delivering information to the user. Also, if a sound channel is used in a video for emitting said at least one piece of information relating to the configuration, if this is monophonic sound, the image reproduction means may be used for reading a purely visual piece of information such as a cartoon, a film, a succession of still images, texts on a page or scrolling basis for providing information to the user.

When the sound track associated with the video is stereophonic then one of the two sound channels may be assigned to the sound track of the video, the other channel being intended for emitting said at least one piece of information relating to the configuration.

In the method according to the invention it is provided that the consequences on the device of the execution of said preparation step and/or of said step for emitting at least one piece of information relating to the configuration of the device are conditioned by the execution of a preliminary step for opening a configuration session executed in the device.

In a more preferred alternative embodiment, an action or a combination of actions with a very low probability of natural occurrence precedes any operation capable of modifying the configuration of the device. This may be for example pressing on one or more buttons of the device, simultaneously or sequentially, engaging an action in relation with the powering-up of the device, actuating one of its sensors if necessary or any other combination of such actions of events.

In the method according to the invention it is provided that the reception and/or the storage and/or the application of all or part of said at least one piece of information relating to the received configuration of the device, after partial or total transformation if necessary, be conditioned by receiving a characteristic piece of information of the device.

This refinement of the invention secures the device towards handling and selection errors from the user during the preparation steps and/or for emitting said at least one piece of information relating to the configuration. Indeed, the configuration information, in the absence of standardization is specific to a given appliance. A same piece of information may however be technically received by different devices but it is highly probable that said piece of information will be interpreted differently by each device. This may lead to surprising results or even problems for a device receiving said at least one piece of information for which it has not been prepared. Thus, it is provided that said at least one piece of information relating to the configuration of a device according to the invention contain identification elements allowing the receiving device to check whether said at least one piece of received information has actually been prepared for it and therefore whether it may make use of the information in order to modify its configuration. This is so provided that optional integrity inspections, the application of which is advantageous, have been passed successfully. If said at least one piece of information relating to the configuration does not meet the test for identifying the target device or if necessary the integrity inspection then the information is rejected without being utilized by the device.

The invention provides a system comprising:
- a device according to the first aspect and/or according to the second aspect of the invention;
- at least one piece of equipment for producing at least one piece of information relating to the configuration of the device; and
- one piece of equipment for emitting at least one piece of information relating to the configuration of the device, said at least one piece of equipment for producing said at least one piece of information relating to the configuration may coincide with or be distinct from the one for emitting it.

All the applications of the device according to the invention are of course comprised within the scope of the invention.

This being the case, the device according to the invention is particularly relevant within the scope of the following applications:

Application of the device according to the invention for saving energy by suppressing electric consumption during standby of at least one appliance, while providing a recording appliance continuously supplied with electric power, with the capability of enabling and/or disabling the electric power supply of at least one other audiovisual appliance such as an external storage device, a tuner, etc., said at least one other audiovisual appliance further being able to have its electric power supply enabled and/or disabled depending on the functional state of said at least one pilot appliance such as a television set.

Application of the device according to the invention for saving energy by suppressing the electric consumption during standby of at least one appliance, while providing an appliance of the Set Top Box type continuously supplied with electric power, with the capability of enabling and/or disabling the electric power supply of at least one other appliance, said at least one other appliance being further able to have its electric power supply enabled and/or disabled depending on the functional state of at least one pilot appliance such as television set.

Application of the device according to the invention for saving energy by suppressing the electric consumption during standby of an electric domestic appliance and/or for reducing the risk of damage from waters, of which it may be the cause, while providing the electric domestic appliance with the possibility of deffered starting in order to benefit from an advantageous rate of electric energy.

Application of the device according to the invention for saving energy by suppressing unnecessary electric consumptions of a heating appliance and/or for reducing the risk of fire of which it may be the cause.

SHORT DESCRIPTION OF THE DRAWINGS

Other advantages and characteristics of the invention will become apparent upon examining the detailed description of embodiments which are by no means limiting, and the appended drawings wherein, according to the first aspect of the invention:

Figure 22:
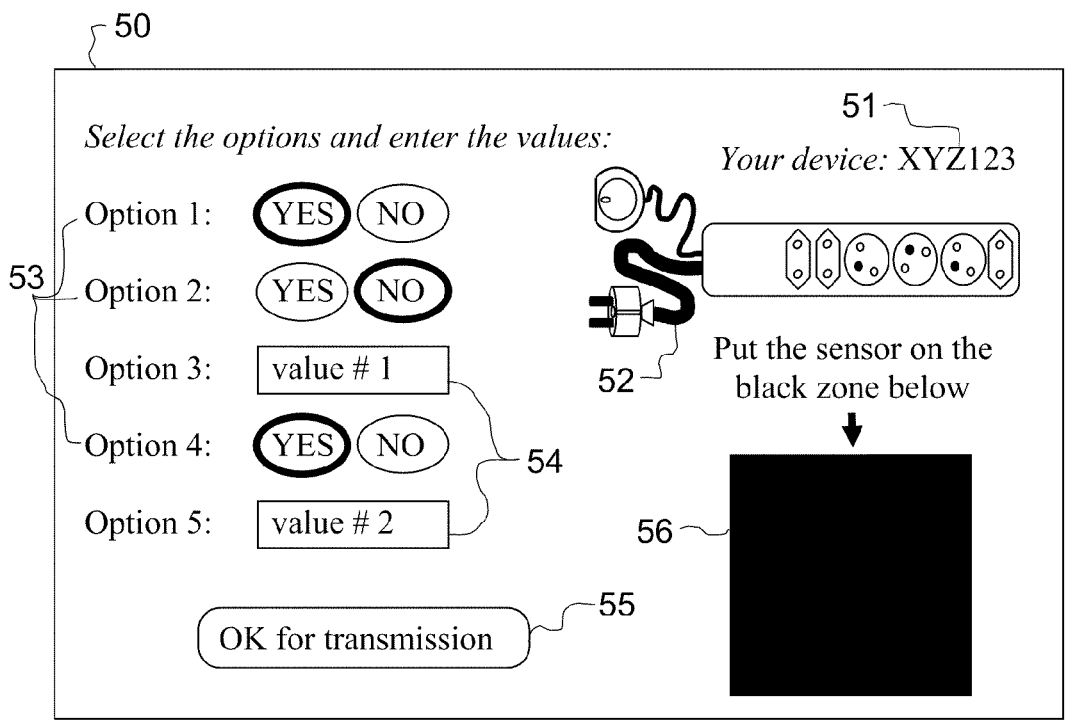

And according to the second aspect of the invention:

FIG. 22 illustrates interactive means for preparing the configuration.

Figure 23:
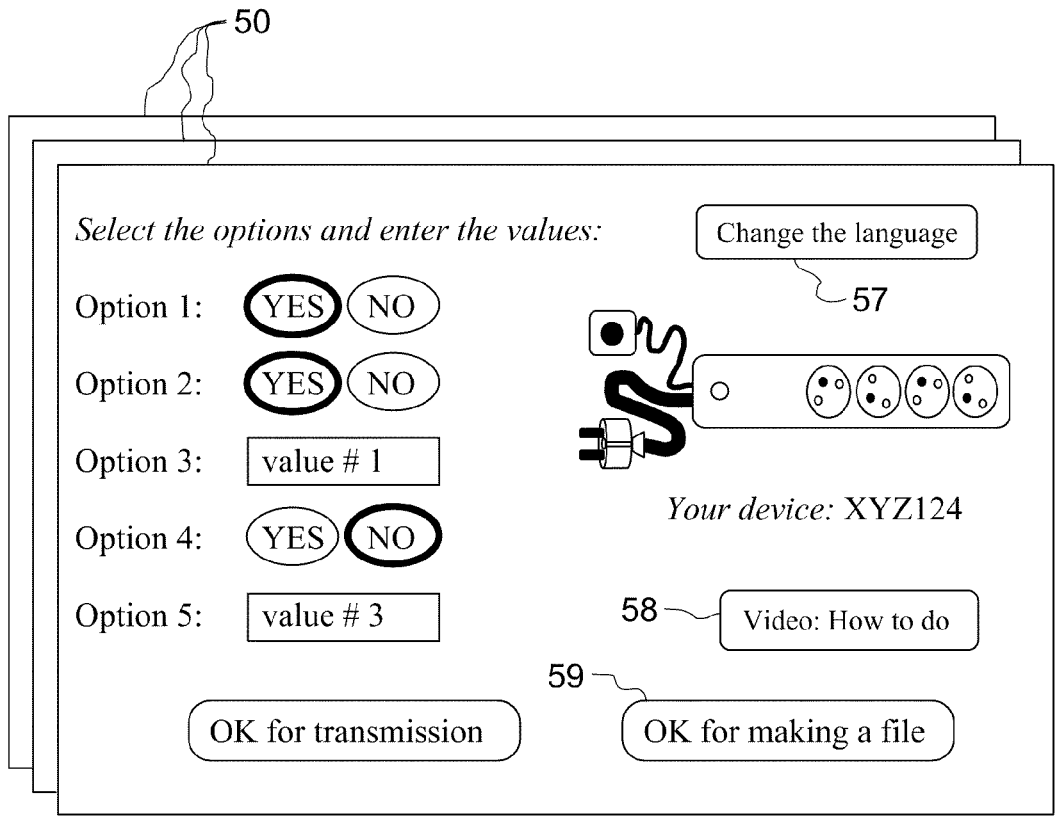

FIG. 23 illustrates other means for preparing the configuration.

Figure 24:
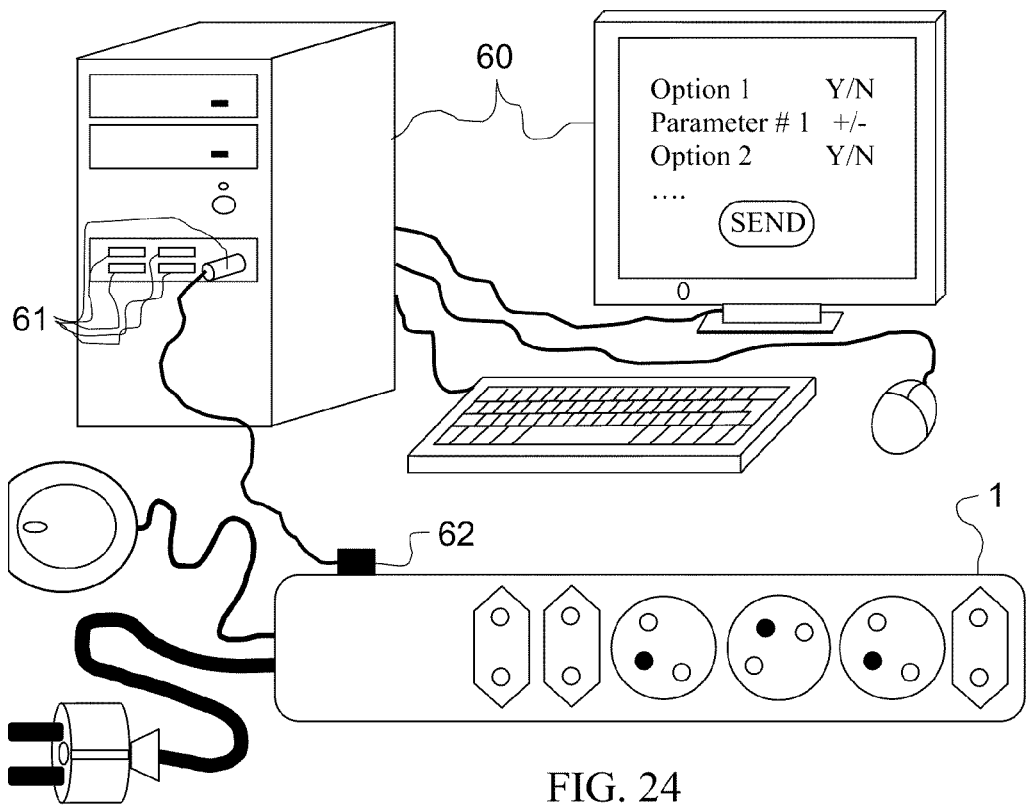

FIG. 24 illustrates the interactive configuration by means of a computer.

Figure 25:
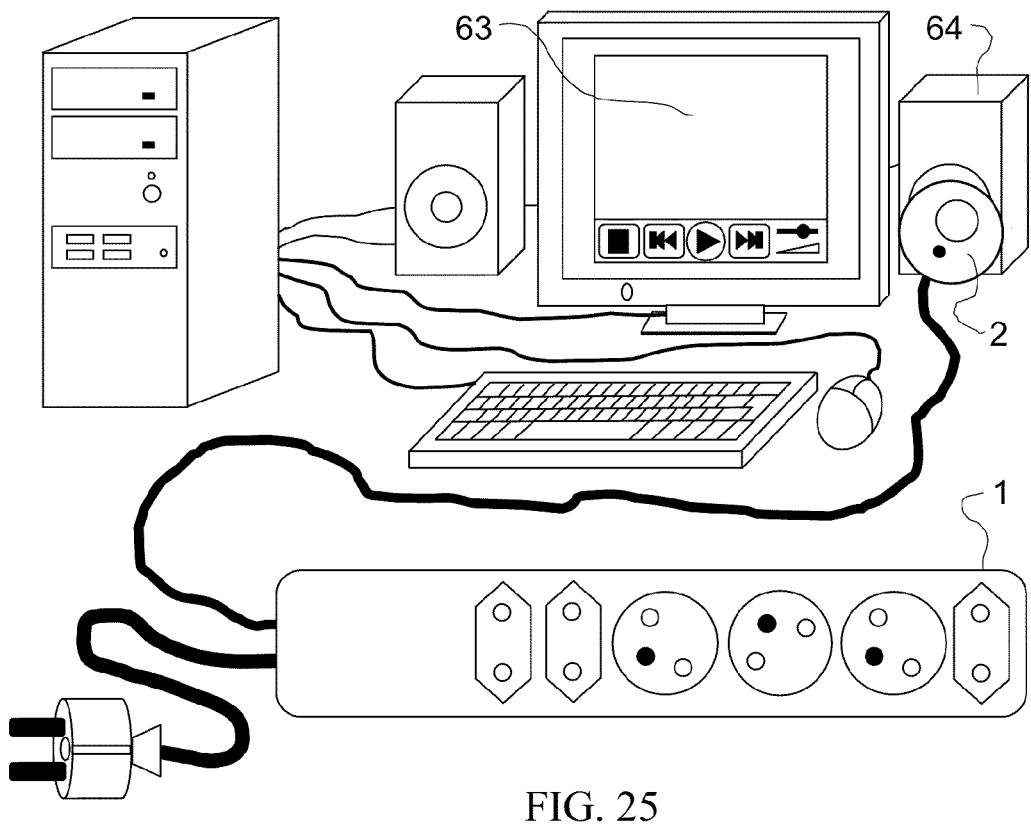

FIG. 25 illustrates the configuration by sound from a computer.

Figure 26:
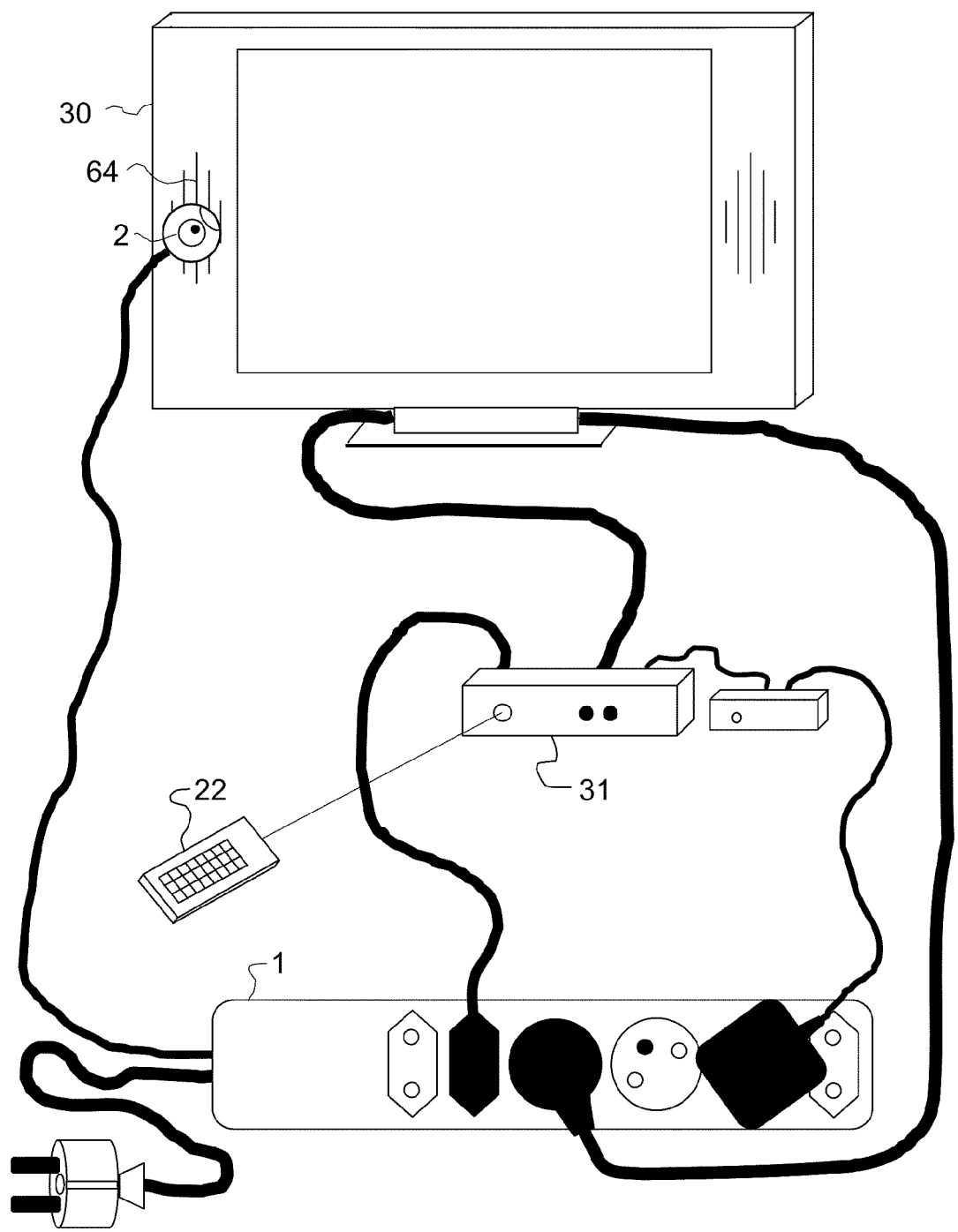

FIG. 26 illustrates the configuration by sound from a television set.

Figure 27:
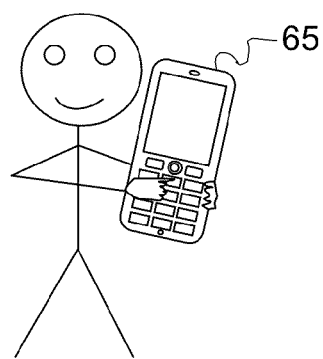

FIG. 27 illustrates the configuration by means of a telephone step 1.

Figure 28:
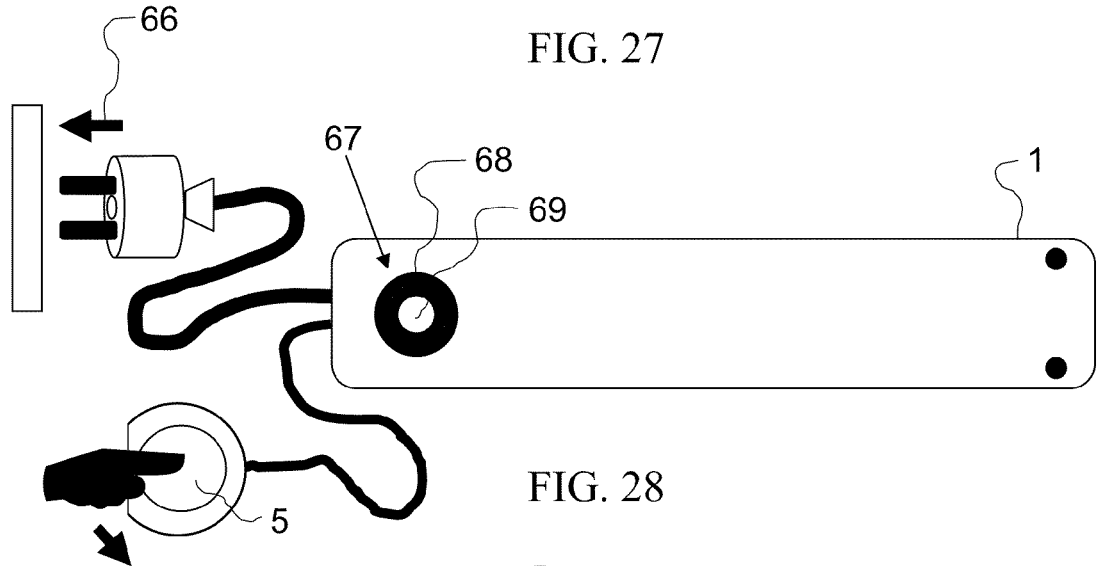

FIG. 28 illustrates the configuration by means of a telephone step 2.

Figure 29:
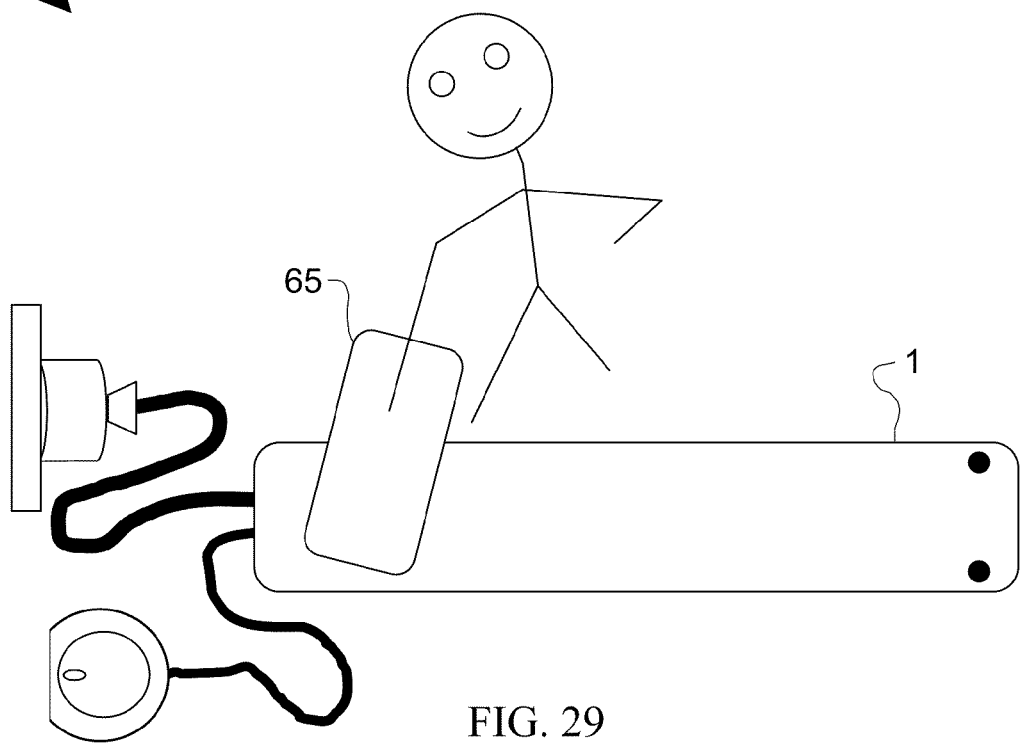

FIG. 29 illustrates the configuration by means of a telephone step 3.

Figure 30:
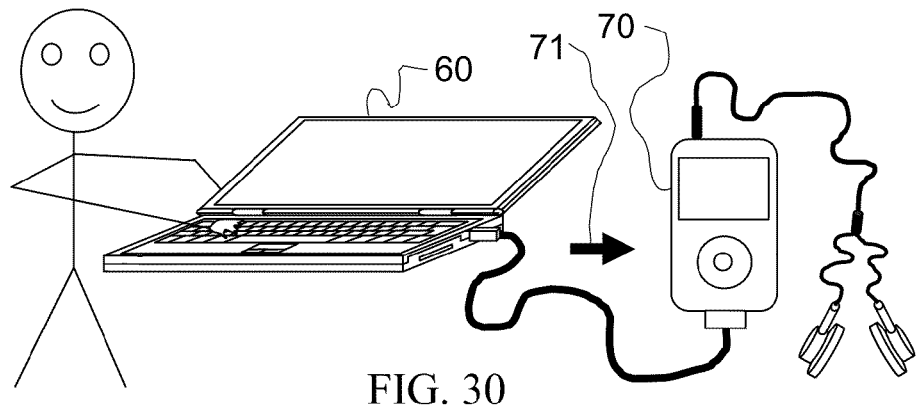

FIG. 30 illustrates the configuration by means of a portable media player step 1.

Figure 31:
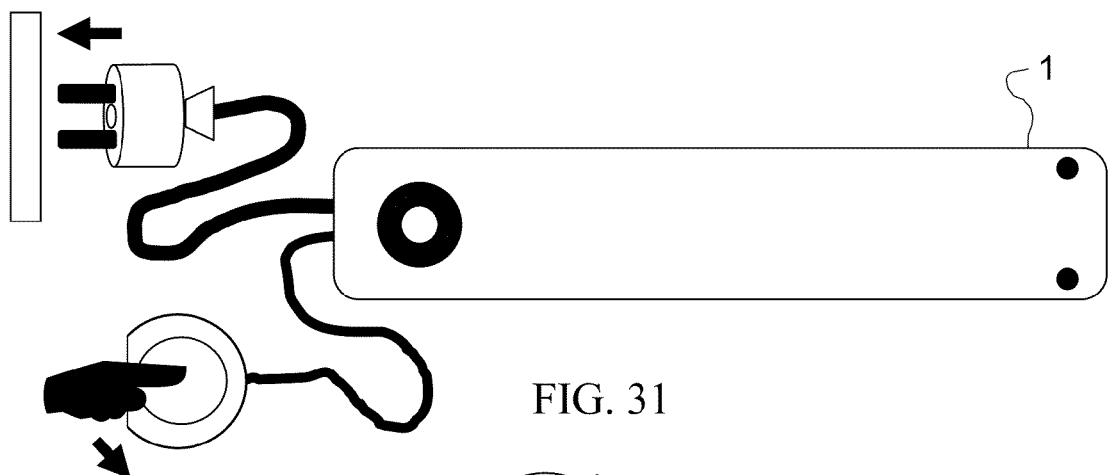

FIG. 31 illustrates the configuration by means of a portable media player step 2.

Figure 32:
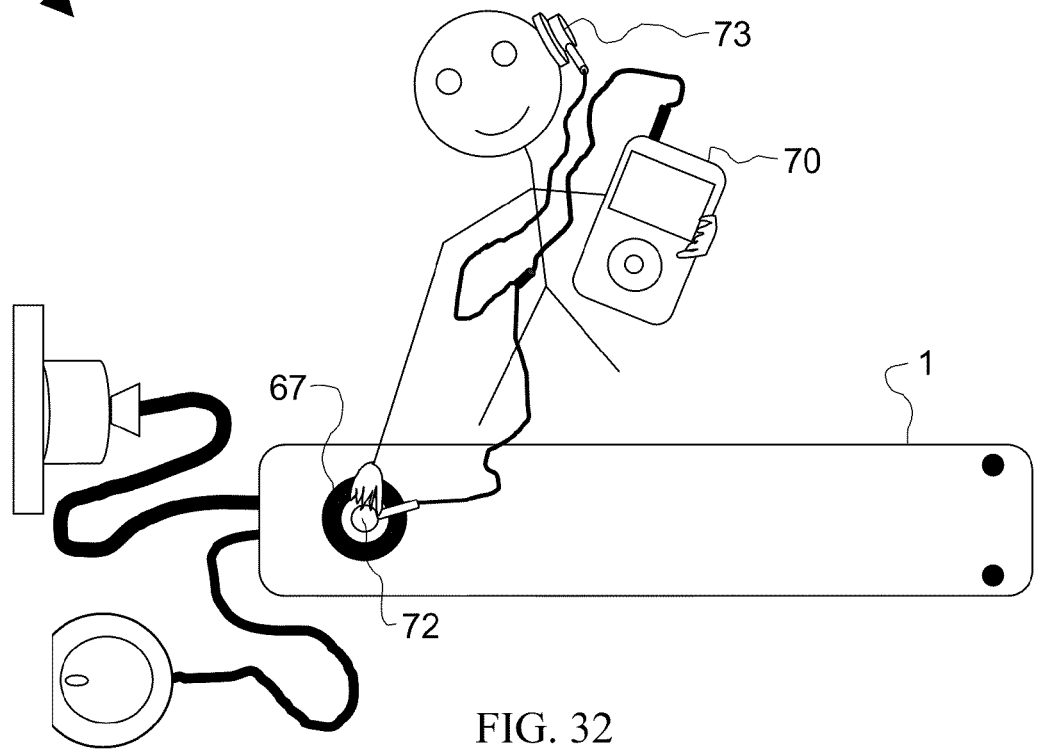

FIG. 32 illustrates the configuration by means of a portable media player step 3.

DETAILED DESCRIPTION OF THE FIGURES AND OF THE EMBODIMENTS

Figure 1:
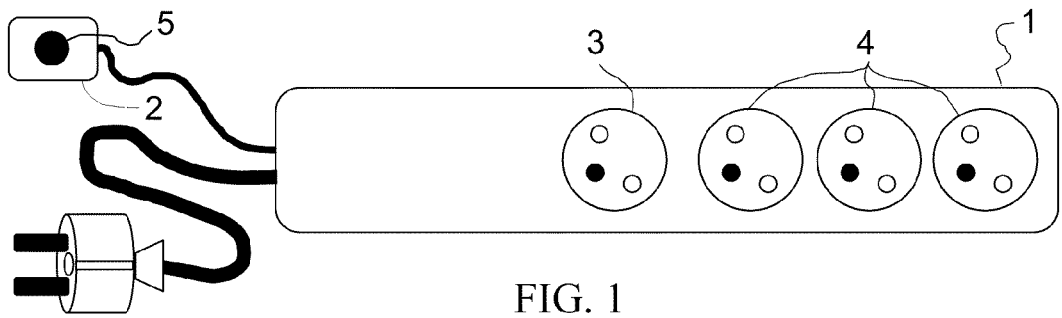
FIG. 1 illustrates a first alternative embodiment of the invention.

Other particularities and advantages of the invention will further become apparent in the description hereafter. In the appended drawings given as non-limiting examples:

FIG. 1 illustrates a first alternative embodiment of the invention wherein the device, shown as two sub-assemblies (1, 2), does not have any hardware resource dedicated to said at least one override operating mode. This simple alternative embodiment of the device provides the advantage of using hardware means similar to those applied in standby cut-off devices of the state of the art, the application of the invention being accomplished by replacing logic means determining a behavior of the state of the art with logic means, made in wired or programmed logic, determining a behavior according to the invention. This hardware may be of the type which cuts off the power supply of the main pilot appliance connected to the socket 3, in addition to cutting off the power supply of the accessories, the powering of which is intended by a plurality of dedicated sockets 4.

The device may also be of the so-called master-slave type, wherein the main pilot appliance remains permanently powered by the socket 3. The button 5 which is shown as being part of a remote control 2 by wired means in this example is the intended means for causing the device to enter said at least one override operating mode. In this exemplary embodiment, saving of means is achieved by using the same button 5 for starting the device in the normal mode or in the override mode. Normal starting is accomplished by pressing once on the button 5 and the override operating mode according to the invention is accomplished by successively pressing twice within a determined lapse of time on this same button 5. It is provided that exiting the override operating mode is accomplished by pressing again on the button 5 and/or automatically when the device is informed that said at least one main pilot appliance plugged in the socket 3 is running. In this exemplary embodiment of the invention, the information of the device relies on measurement means giving representative information on the power consumed by said at least one main pilot appliance and means for determining the functional state of said at least one main pilot appliance, by comparison between said information and at least one first threshold determined beforehand. The device is thus informed that said at least one main pilot appliance plugged in the socket 3 is running when the power consumption is larger than or equal to a first threshold determined beforehand.

Figure 2:
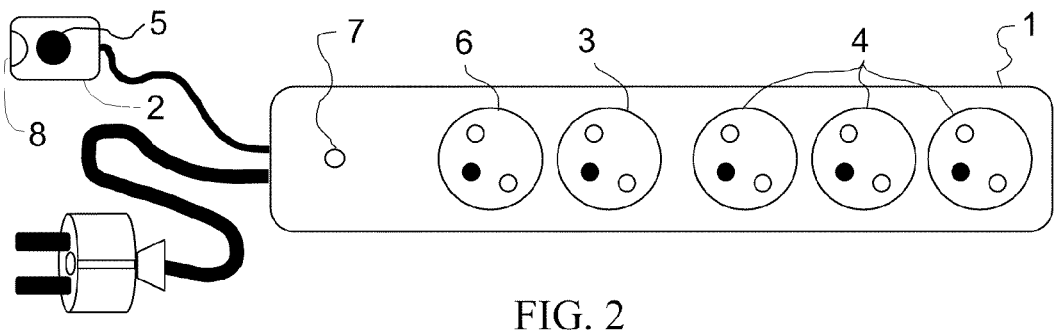
FIG. 2 illustrates a second alternative embodiment of the invention.

FIG. 2 illustrates a second alternative embodiment of the invention which differs from that of FIG. 1 by adding in the portion 1 of the device comprising the connectors, a socket 6 permanently powered for linking appliances thereto for which the power supply cannot be interrupted, an indicator lamp 7 and an infrared remote control signal sensor 8.

In an alternative wherein the external remote control would be dedicated to the device, the button 5 may then be proposed to the user on the remote control casing 2 and/or on the specific remote control associated with the device. In the advantageous case where any remote control associated with third party equipment may be used after learning about all or part of the signals or without learning, then at least one button 5 comprised in a sub-assembly of the device (1 or 2) is the simplest means for allowing entering and/or exiting said at least one override operating mode. With the indicator 7 it is further advantageously possible to signal to the user that the device 1 is in an override operating mode. In certain alternative embodiments, this indicator may be deployed remotely or duplicated in the remote control 2 for easier viewing. It may indeed be troublesome for the user to have no means for differentiating the normal mode and an override operating mode in that both modes may lead to behaviors of the device complying with opposite logic which may arouse fears of malfunction.

Figure 3:
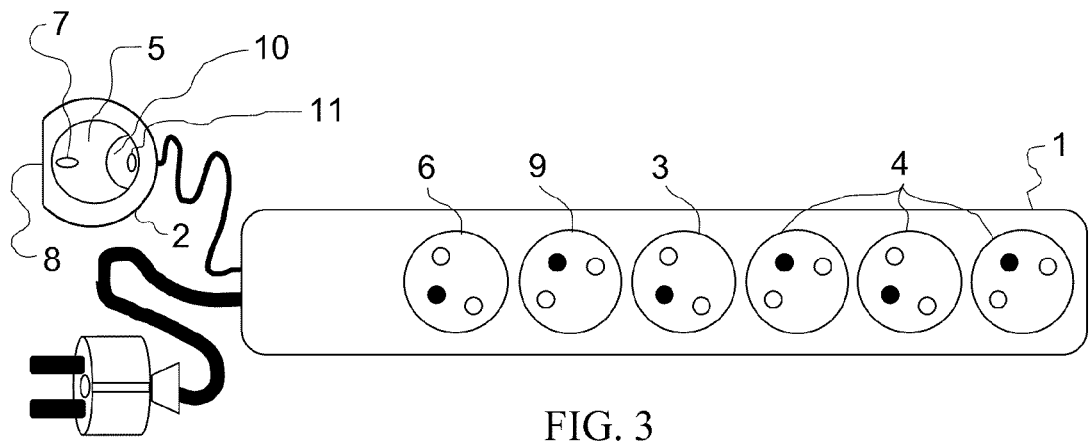
FIG. 3 illustrates a third alternative embodiment of the invention.

FIG. 3 illustrates a third alternative embodiment of the invention which differs from that of FIG. 2 by adding a permanently powered socket 9 and which is associated with an internal measurement and associated processing circuit with which it is possible to determine totally or partly the state of the device depending on the power consumed by one or more appliances forming the secondary pilot appliance plugged in the socket 9. In this example, an additional button 10 is dedicated to said at least one override operating mode, the button 5 being exclusively assigned to starting the normal mode. An indicator 7 placed so as to be visible on the remote control 2 allows viewing of the different operating states of the device in the normal mode. With an indicator 11, it is possible to view the different operating states of the device in the override mode. An infrared signal receiver 8 further allows remote starting of the device by means of a remote control. Considering the naturally exceptional character of the override operating mode, provision is made for reserving the control for entering and/or exiting this mode for starting the device, to actions from the user on at least one button (5, 10) of the remote control 2, reserving the use of a possible remote control for normal starting of the device. Exiting from the override operating mode may for example be accomplished by again pressing on the dedicated button 10 or even also by pressing on the main button 5 or further automatically as described within the scope of FIG. 1. It is provided that the handling of entering and exiting the override operating mode is entirely automatic depending on the state of said at least one secondary pilot appliance plugged in the socket 9. In the most universal alternative of FIG. 3, with multiple functional possibilities, means are provided for configuring the device in order to adapt all or part of the functional options to the desires of the user and/or to the constraints of its installation. Advantageously, it is provided that the sockets are associated with colors and/or with markings by pictograms and/or by texts for easily differentiating their use. For example, one or more green sockets 3 are dedicated to the linking of one or more appliances forming the main pilot appliance, one or more black or grey sockets 4 are dedicated to the linking of accessory appliances, one or more orange sockets 9 are dedicated to the linking of one or more appliances forming the secondary pilot appliance, possibly one or more red sockets 6 are dedicated to the linking of appliances permanently connected to the electric mains.

Figure 4:
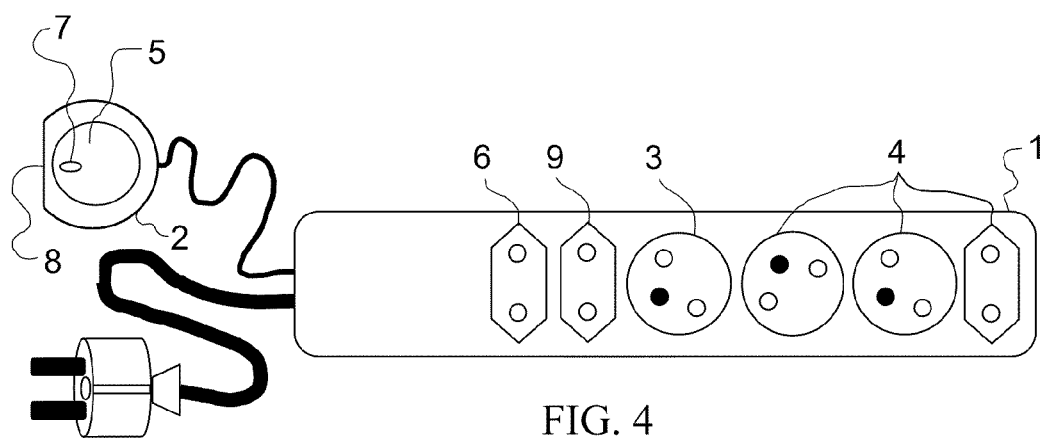
FIG. 4 illustrates a fourth alternative embodiment of the invention.

FIG. 4 illustrates a fourth alternative embodiment of the invention. This is an alternative of the device illustrated by FIG. 3, globally providing the same functionalities but implemented at a lower cost. This alternative differs from the one illustrated by FIG. 3 by the removal of the specific button for control of said at least one override mode, the corresponding controls being at least party ensured by a dual use of the single button 5. The selection of the operating mode for starting is the same as the one described within the scope of FIG. 1. FIG. 4 further illustrates a different layout of the sockets (3, 4, 6, 9) for example by selecting sockets without a ground pin for some of then, those which are most probably associated with low power appliances without any connection to ground. A common indicator 7 placed so as to be visible on the remote control 2 allows viewing of the different operating states of the device both in the normal mode and in the override mode. The current normal or override operating mode is differentiated by the blinking rates and/or colors dedicated to each operating mode.

Figure 5:
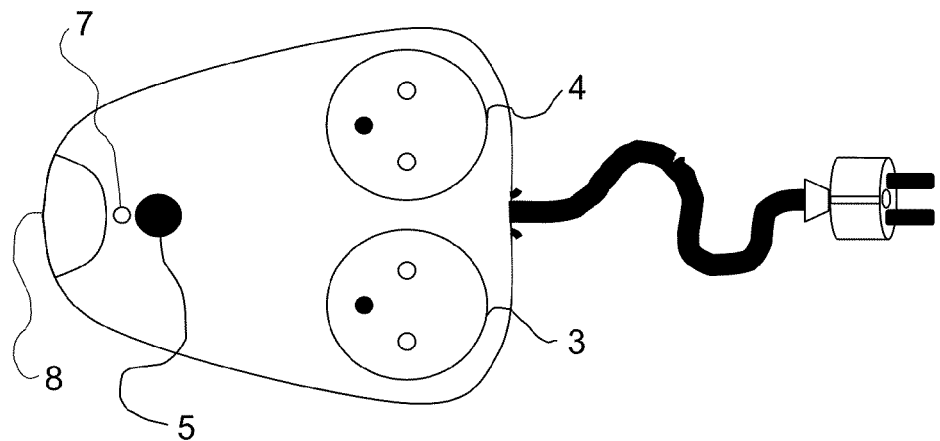
FIG. 5 illustrates a fifth alternative embodiment of the invention.

FIG. 5 illustrates a fifth alternative embodiment of the invention which differs from the previous ones by a low cost one-piece approach of the device. The main part of the means shown in the earlier alternatives is again found therein, a button 5, an indicator 7 and a sensor for infrared remote control signals, in a form which favors compactness. For example the socket dedicated to said at least one main pilot appliance and the socket 4 dedicated to the accessories are found again. Each of these sockets may be replicated by multiple external sockets.

Figure 6:
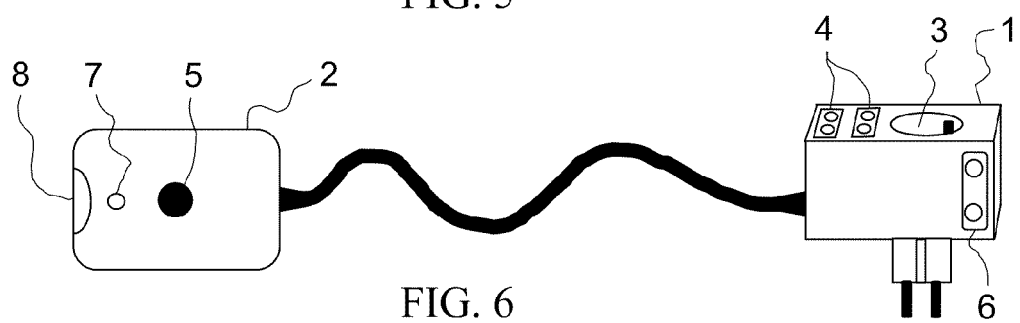
FIG. 6 illustrates a sixth alternative embodiment of the invention.

FIG. 6 illustrates a sixth alternative embodiment of the invention shown as two sub-assemblies (1, 2) comprising resources laid out otherwise than in the earlier alternatives. In this example, all the electronics is comprised in the remote control 2 as well as the button, the indicator and the infrared sensor 8. The block 1 only comprises sockets and their inner wiring. It is provided that block 1, while being particularly compact and made at a low cost, nevertheless comprises specific sockets 3, 4 and 6 respectively for said at least one main pilot appliance, for accessories and for an appliance which has to be continuously powered, as in the versions described earlier. This layout of the sockets has the purpose of optimizing the bulkiness and the cost of the sub-assembly 1 of the device in order to reduce the portion of the device which is impacted by the changes in plug or socket standards depending on the countries where the device is used. The sub-assembly 2, which groups the largest portion of the costs and complexity is identical for all the countries and may therefore be produced while benefiting from substantial savings in scale. In an alternative not shown, it is provided that the block 1 only comprises a plug for linking it to the electric mains and only a single socket for linking said at least one appliance. The device is completed if necessary with an external multiple socket in order to allow the linking of a plurality of appliances. Suitable means for this configuration either incorporating or not power measurement means as already described allow application of said at least one override operating mode.

Figure 7:
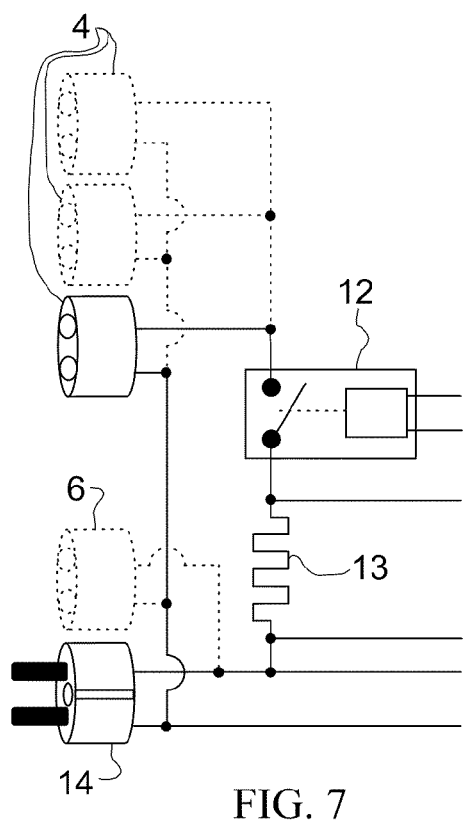
FIG. 7 illustrates a first power circuit.

FIG. 7 illustrates a first alternative power circuit comprised in the device. This is an alternative provided for cutting off the whole of the loads by means of a switching device 12 such as an electromechanical relay. The power circuit comprises means such as a power resistor 13 having a low ohmic value in order to measure the current flowing in said at least one compliance and thereby obtaining a quantity representative of the consumed power. The appliances are indifferently connected to one or more sockets 4. The device is laid out so as to recognize the functional state of said at least one pilot appliance by means of a determined threshold so that the sum of the powers of said at least one main pilot appliance in standby and that of the running accessories is below it. The device may reach the same result by ensuring dynamic monitoring of the power consumed by the whole of the loads in order to detect the setting to standby of said at least one pilot appliance by measuring a sudden decrease in a value determined beforehand relatively to the current measurement, for example as a percentage of the measurement. In a preferred alternative, this value may also be calculated by the difference between the consumption upon running and in standby of said at least one main pilot appliance and then stored by the device during a preliminary learning step. The power circuit further comprises a plug 14 for the linking to the electric mains and if necessary a socket 6 wired in parallel on the plug 14 in order to continuously power appliances for which the power supply cannot be interrupted.

Figure 8:
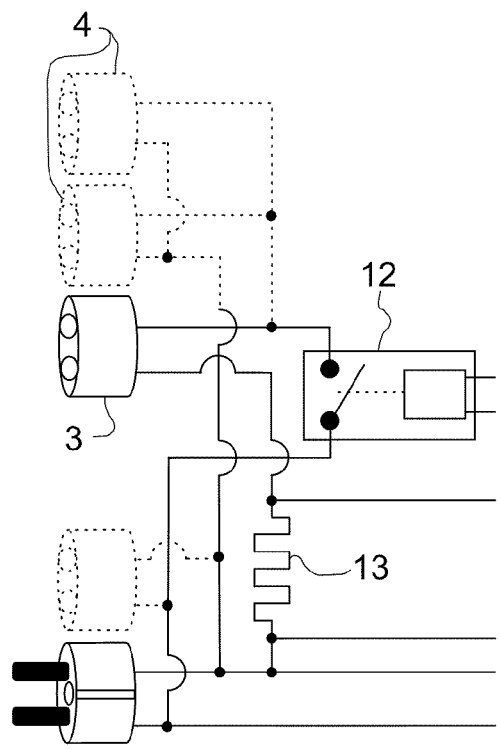
FIG. 8 illustrates a second power circuit.

FIG. 8 illustrates a second alternative power circuit comprised in the device. In this particularly preferred alternative, the same resources are again found as in the circuit of FIG. 7 such as the relay 12 for cutting off the power supply of the whole of the loads but these resources are laid out in this example in order to separate the power supply 3 of said at least one pilot appliance from that 4 of the other appliances. Thus, the power resistor 13 allows the device to measure the power exclusively consumed by said at least one pilot appliance. Thus, the device may undoubtedly determine the functional state of said at least one pilot appliance and is capable of ensuring secure operation, even in the case when the power consumed by the accessories is greater than that consumed by said at least one pilot appliance.

Figure 9:
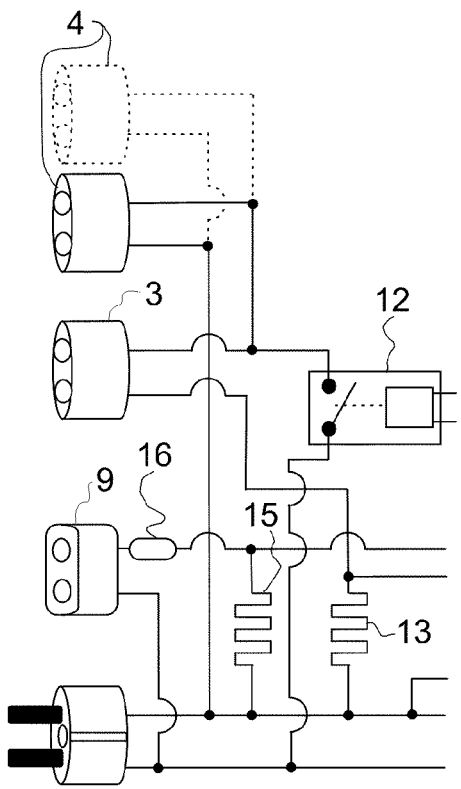
FIG. 9 illustrates a third power circuit.

FIG. 9 illustrates a third alternative power circuit. This alternative is based on the circuit of FIG. 8 which further comprises a socket 9 specifically dedicated to the application of the invention. This continuously powered socket is associated with means for measuring the power consumed by said at least one secondary pilot appliance in the sense of the invention. In the case of a current measurement conducted via a power resistor 15, a fuse or a circuit breaker 16 in series with the resistor is provided for protecting the circuit from the consequences of requesting excessive current. For the loads, the power supply of which may be cut off by the relay 12, it is advantageous to protect the circuit against overloads by automatic disconnection when the power exceeds a value determined beforehand. It is provided that the functionalities associated with the continuously powered socket are defined by a suitable configuration. Thus the socket 9 may be used for linking said at least one secondary pilot appliance or for linking an appliance to be continuously powered, having no influence on the operation of the device. According to the selected configuration, the device may apply an override operating mode according to the invention from the functional state of said at least one secondary pilot appliance or another override operating mode.

Figure 10:
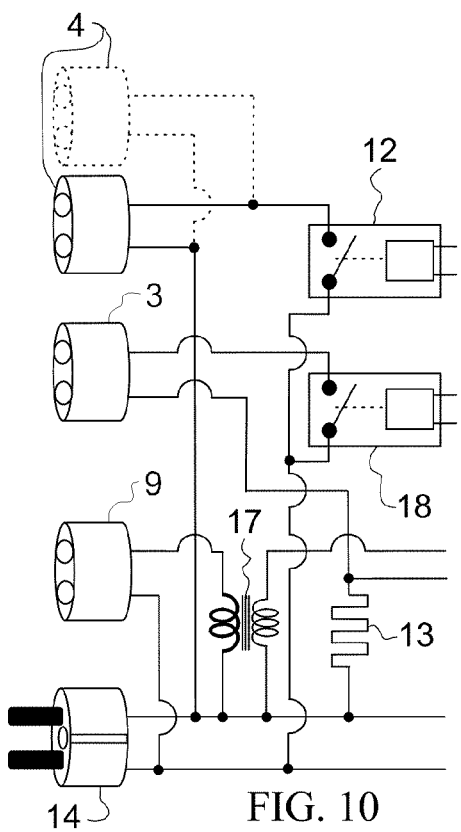
FIG. 10 illustrates a fourth power circuit.

FIG. 10 illustrates a fourth alternative power circuit which differs from that of the FIG. 9 in that the circuit of the permanently powered socket 9 resorts to means for measuring the current which are tolerant to overloads such as a current transformer 17, the primary of which may withstand the maximum current allowed by the sockets (3, 4, 9), the plug 14 and the cables of the device. Protection against overloads is then ensured outside the device by means for protecting the electric installation. In the example illustrated by this figure a second switching means such as a relay 18, is also applied in order to separately control the power supply of said at least one main pilot appliance and that of the accessories in particularly refined override operating modes, in which only the useful appliances in a given functional context are powered in order to maximize energy savings.

Figure 11:
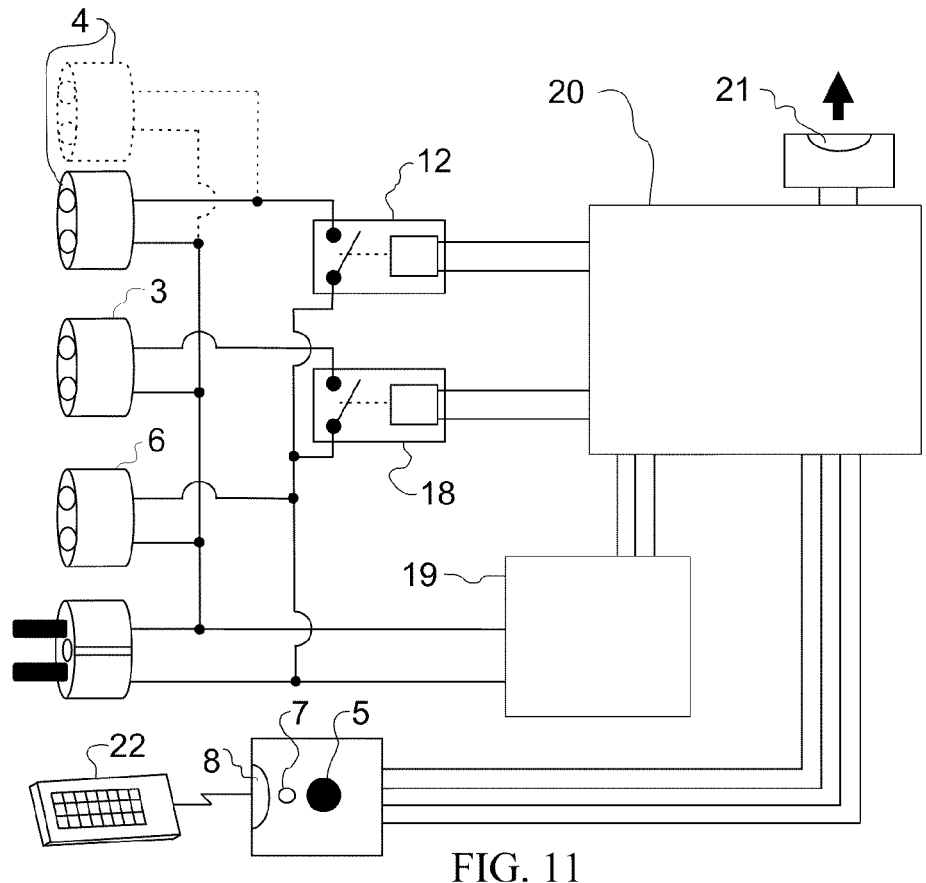
FIG. 11 illustrates an application without power measurement.

FIG. 11 illustrates an application of the invention in a device not comprising any power measurement. This alternative embodiment is of interest in that it is a priori inexpensive to apply and with simple means it is possible to meet the electric safety requirements since the active portion of the electronics is not necessarily at the potential of the mains like most alternatives comprising measurement means. A power supply circuit 19 for example delivers two DC voltages such as 24V for powering the relay(s) (12, 18) and 5V for powering the electronic circuits (8, 20, 21). The power supply circuit further advantageously ensures galvanic insulation between the electric mains and the electronic circuits (8, 20, 21). Although one or more buttons are not indispensable for applying said at least one override operating mode according to the invention, the presence of at least one button 5 on the device is advantageous in that it allows starting of the appliances in the case of unavailability of a suitable remote control 22. At least one indicator 7 is provided for signaling in a differentiated way that the device is in an override operating mode. The presence of the separate switching means (12, 18) for said at least one main pilot appliance and for the accessories introduced in the example of FIG. 10, and that of the continuously powered socket 6 illustrate the fact that all the refinements of the invention may be applied without any power measurement means. This being the case, there is no departure from the scope of the invention in the case of a minimalist application for example only comprising a single switching means.

The optional addition of means 21 for emitting infrared commands towards appliances as well as more than one switching means allows the application of many functional refinements involving at least one override operating mode according to the invention.

Figure 12:
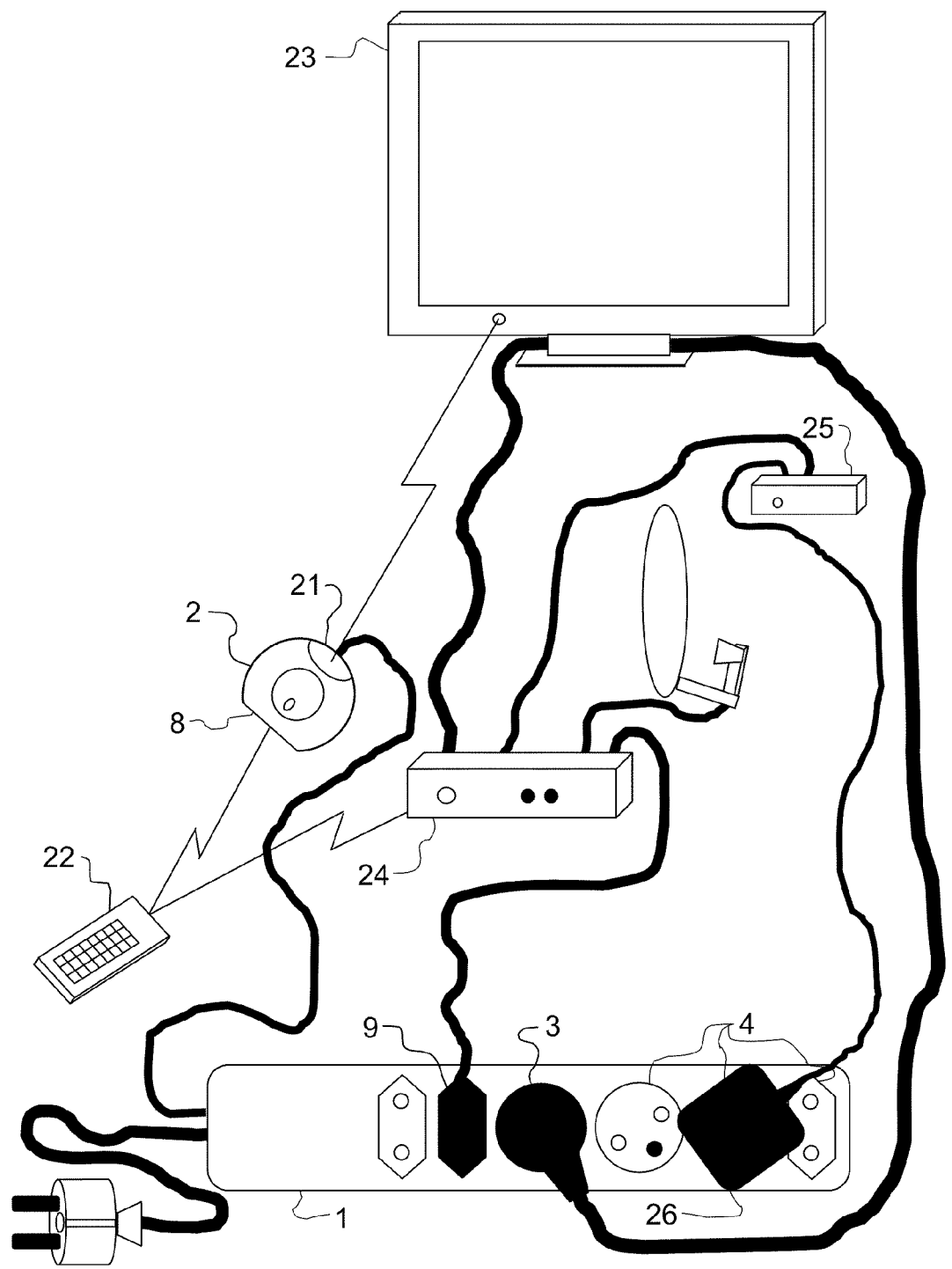
FIG. 12 illustrates the device in a first context of use.

FIG. 12 illustrates the device in a first context of use.

In this exemplary embodiment of the invention, this is a functional group of the audiovisual centre comprising the television set 23 playing the role of a main pilot appliance, a casing of the <<Set Top Box>> type 24 for receiving encrypted television programs broadcast by satellite or by any other means, the remote control 22 associated with the casing, an external hard disk 25 for storing audiovisual contents and its power supply 26. The device according to the invention is applied in this example as a main block 1 and a remote control 2. The main block 1 comprises among other resources, a socket 9 for a secondary pilot appliance, a socket 3 for a main pilot appliance and sockets 4 for powering accessories. The remote control 2 comprises among other resources, a receiver 8 and an emitter 21 of infrared signals. The casing 24 is further provided with means recording digital contents on demand from the user and/or within the scope of broadcasting methods of the operator. Said recording means use the external hard disk 25 for storing the digital contents. Application of the invention allows continuous powering of the casing 24 which, in the more elaborate versions has its own standby operating mode and is capable of switching to the running mode when one or several events controlled by the operator occur. In this representative context of application of the invention within the scope of current audiovisual equipment, the override operating mode of the device consists of powering one or more other appliances such as external means for storing digital contents when a secondary pilot appliance, in this example the casing 24, is in a running functional state although the main pilot appliance, in this example the television set 23, is off. Said at least one other appliance is also powered when the main pilot appliance is in a running functional state and the power supply of said at least other appliance 25 is cut off when the main 23 and secondary 24 pilot appliances are in a standby or off functional state. In a particularly optimized alternative embodiment of the invention, it is provided that said at least one of the other linked appliances, for which the question is to control the electric power supply, only comprises said at least one accessory appliance with the exclusion of said at least one main pilot appliance. With this refinement, it is possible to arrange for the secondary pilot appliance 24 to be able to control the power supply of appliances of interest such as receivers or decoders which are potential sources of programs or further external storage means 25 without affecting the powering of the main pilot appliance 23 which, when this is a television set, or a videoprojector, may advantageously remain off. Another provided refinement is based on the presence of an infrared emitter 21 in the more elaborate alternatives of the device. This emitter is configurable by learning the codes sent by another remote control received by the sensor 8 and stored in the device in memory or configurable by explicit designation of at least one appliance to be controlled, the corresponding codes of which are extracted from a data base. The device if necessary ensures transcoding of the commands emitted by the main remote control 22 and received by the sensor 8 and then emission by the infrared emitter 21 or by any other functionally equivalent means such as occasional infrared emitters to be bound by a double-faced adhesive tape close to the sensor of the relevant appliances. Thus, a single remote control is required for controlling several appliances and the command for starting the casing 24 which is the main source of programs causes powering up of the television set and then its starting by sending at least one suitable infrared command by the emitter 21. The same functional result may be obtained without any infrared emitter in the device, if the link between the casing 24 and the television set comprises a transmission of commands compatible among the appliances as this is the case for example with HDMI links in their most advanced applications.

Figure 13:
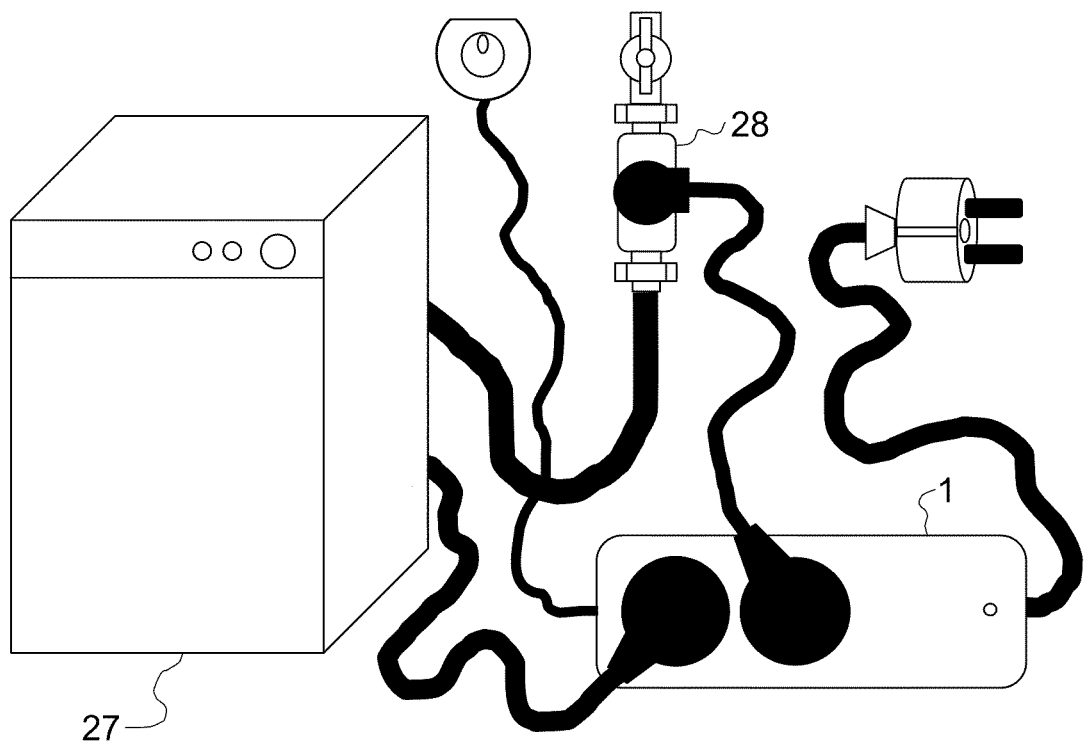
FIG. 13 illustrates an alternative of the device dedicated to white products.

FIG. 13 illustrates an alternative device dedicated to white products.

This figure illustrates an application of the invention dedicated to large electric domestic appliances. Optimization of the device 1 according to the invention for this category of appliance is advantageous since these are appliances characterized by possible high power consumption, by no or very few accessories or by the frequent presence of a connection to a water supply network. This is for example a dishwasher, a washing machine, a tumble-dryer. Thus a device adapted to these appliances will comprise means for switching the relevant maximum power with the sockets and standard cables used by the appliances. Although a single socket for controlled powering of the electric domestic appliance 27 which plays the role of a main pilot appliance without any indispensable accessory is present, the presence of a second socket is advantageous for connecting a safety solenoid valve 28 if necessary. The optional accessory which is a safety solenoid valve, may be connected to a controlled socket of the device 1 which is not connected to the current measurement circuit, for example a socket 4 of a power circuit of FIG. 8. This being the case, considering the negligible power consumed by the solenoid valve relatively to that of internal resources of the appliance such as a motor or a heating resistor, it is possible to simplify the device by cabling in parallel all the loads in a current measurement circuit like the one in FIG. 7. Considering the significant powers consumed by electric domestic appliances and although the solution for measuring the current with a power resistor 13 of FIG. 7 or 8 is possible with the use of a shunt dimensioned for these powers, the use of a current transformer in the power circuit is particularly suitable as a means for measuring the current consumed by said at least one main pilot appliance. The override operations of the device according to the invention which are adapted to this case of use for example are the tolerant starting relatively to a deferred starting of the cycle of the appliance. By deferred starting is generally meant for this type of appliances, the possibility of programming on the actual appliance a starting of the cycle after a determined time. Another type of deferred starting of the cycle is based on the detection of an external condition such as a switching to an economical electric power rate by the appliance. Thus, the application of the invention leads to continuously powering said at least one appliance although the latter is in a standby functional state during which it awaits the expiry of a time-out or the switching to an economical electricity rate. When the electric domestic appliance switches to a running functional state, the device then automatically exits the override operating mode so that it behaves as a conventional standby cut-off device, i.e. it maintains the powering of said at least one appliance as long as the consumed power is not continuously below a threshold determined beforehand during a period of time determined beforehand.

The device advantageously comprises another override operating mode which is based on the detection of an event without any direct relationship with the functional state of said at least one main pilot appliance. For example, the question is of automatically disconnecting an electric domestic appliance when a water leak is detected although said at least one main pilot appliance is running. In this case, said at least one appliance for which the question is of cutting-off the power supply, comprises at least the main appliance 27 which generally contains at least one solenoid valve and one draining pump, for which cutting-off the power supply is likely to suppress the effect of the water leak. An additional solenoid valve 28, mounted on the water inlet tap by rigid metal means at the outlet of which the water inlet of the electric domestic appliance is connected, advantageously completes the installation as an appliance for reinforcing the safety of the installation.

Of course, in the case of electric domestic appliances which may be connected to a hot water inlet, a second solenoid valve may advantageously be added or further, the solenoid valve with a single hydraulic circuit may be replaced with a solenoid valve with a double circuit capable of cutting off the cold and hot water supplies with the same electric means.

Figure 14:
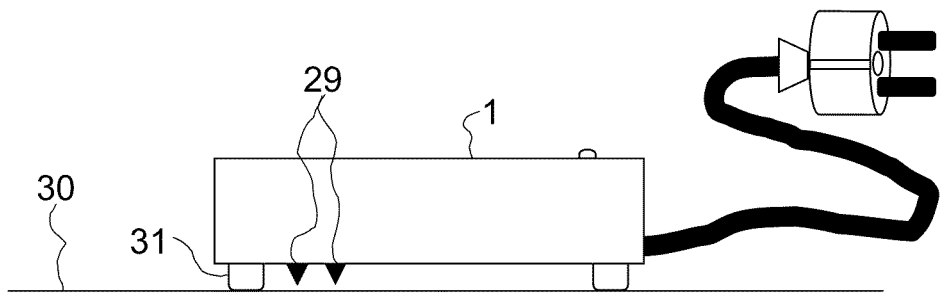
FIG. 14 illustrates a function of the device for detecting water leaks.

FIG. 14 illustrates a function of the device for detecting water leaks.

A particularly preferred version of the device is provided in the case of electric domestic appliances. This version as described earlier further comprises a probe to be laid on the ground at the bottom of the electric domestic appliance, which is capable of detecting a water leak. It is provided that the probe be made in a remotely deployed form which is permanently or removably linked to the device by any wired or non-wired means. It is also provided that the probe should be arranged in the lower face of the casing of the device 1 so as to be operational when the device is laid on the ground as illustrated by FIG. 14. One or two electrodes 29 are placed slightly set back from the surface of the ground 30 by supporting points 31 provided for this purpose. When the ground is dry, the electrode(s) are insulated from the ground and/or from each other. Of course, other means for example resorting to optoelectronics, may also be used for detecting the presence of water on the ground.

Figure 15:
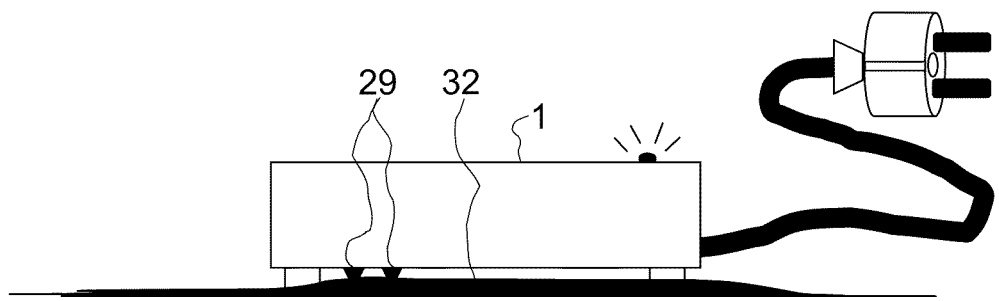
FIG. 15 illustrates the leak detection function in the presence of water.

FIG. 15 illustrates the leak detection function in the presence of water.

The detection of the presence of water on the ground may be accomplished for example by having a current flow between two electrodes 29 or between an electrode and the ground. This figure shows how a film of water 32 of a certain thickness reaches the electrodes and causes detection of the event which leads the device 1 to disconnecting the power supply of the electric domestic appliance and if need be of a safety solenoid valve so that the appliance is in a running functional state.

Figure 16:
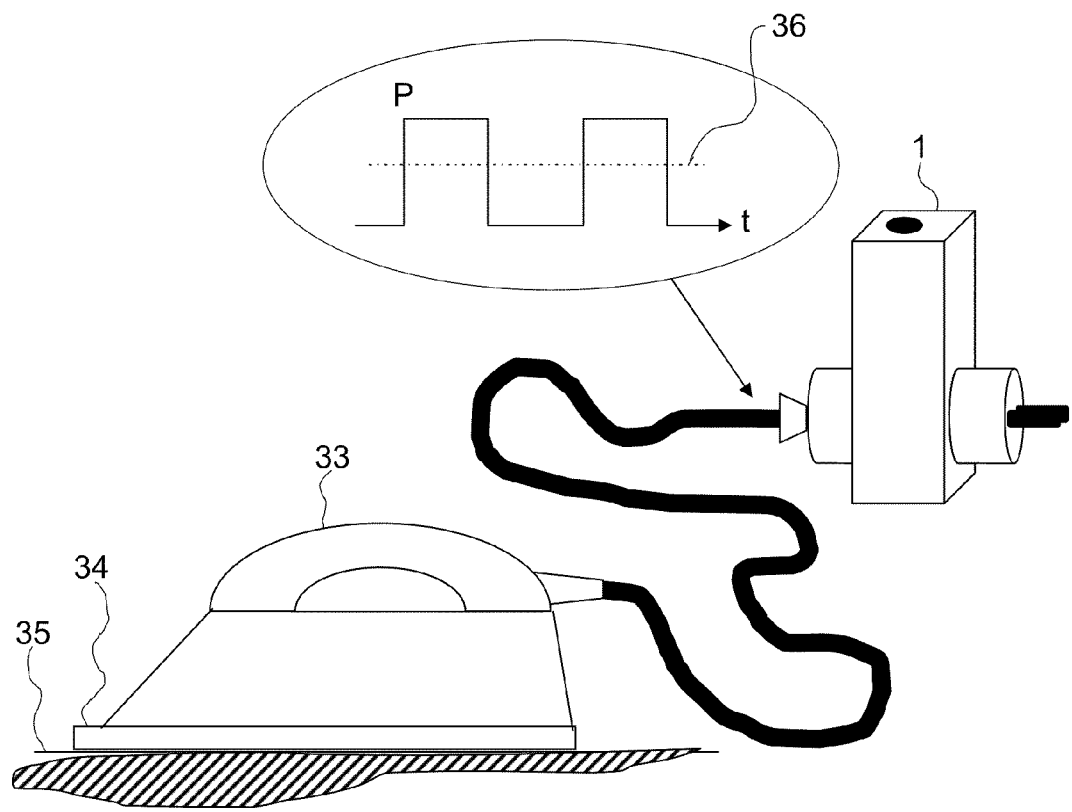
FIG. 16 illustrates a first alternative for a heating appliance in action.

FIG. 16 illustrates a first alternative for a heating appliance in action. This is an application of the invention intended for heating electric appliances such as an iron 33. The invention in this context essentially aims at reducing the risk of fire in the case when the appliance has been left running by forgetfulness. The appliances of this category are characterized by a permanent running state as soon as they are linked to the electric mains. They generally comprise an electromechanical or electronic thermostat which drives a heating resistor on an on/off basis. The result of this is the consumption of a current which alternates between zero or a very small value and the rated power of the heating resistor. The frequency and duty cycle of the power curve of the appliance versus time depends on the heating power to be provided which depends on the adjustment of the set temperature value and on the use of the iron. This type of appliance cannot be suitably handled by a standby cut-off device of the state of the art, in that it cannot undoubtedly determine for any adjustment of the set temperature, the type of running mode in which the appliance is found. In this application of the invention, the value of the power threshold determined beforehand with which the measured power is compared, is not critical since for ensuring its function, the appliance cannot have a power of less than 600 W, further the power consumed by an electronic thermostat when it does not power the heating resistor is low. Thus, provision is made for setting by design any value comprised for example between 10 W and 100 W as a predetermined threshold value. This value may be configured or be subject to adjustment or a learning phase. FIG. 16 illustrates the position of the appliance in action. The heating sole 34 is in contact with materials 35 such as the fabric to be ironed and the ironing support which absorb heat. Absorption of heat and therefore of electric energy is further increased in the case of an iron producing steam. In this situation, a significant amount of energy is required in order to maintain the iron at its set temperature value. The illustrated power curve shows the long duration during which the heating resistor is powered by the thermostat of the appliance as well as the relatively high frequency of these heating times. The horizontal line 36 as dash and dot lines represents the threshold determined beforehand which is compared with the power consumed by the appliance within the device 1 in order to allow it to start and stop the counting of the heating time. In this example which corresponds to the appliance in action, the device restarts an automatic disconnection time-out which has a duration determined beforehand every time that the heating time exceeds a value determined beforehand. Powering of the appliance is maintained as long as the automatic disconnection time-out does not elapse. In certain more sophisticated alternatives, provision is made for also counting the time during which the resistor is not powered in order to calculate, with the heating time, a quantity representative of the duty cycle which is compared with a value determined beforehand of same nature for restarting the disconnection time-out.

Another alternative device according to the invention capable of reinforcing safety in the use of an iron is provided. The device consists of a main casing 1 and of a remotely deployed portion 2 which is integral with the iron. The remotely deployed portion is linked to the main casing through wired means or wireless means. The remotely deployed portion comprises a motion sensor such as a ball establishing a contact between two electrodes in a certain position, a MEMS component or any other equivalent means, the remotely deployed portion advantageously comprises the start button for improving its accessibility. In the case of the use of wireless means, the remotely deployed portion further comprises a small short range radiofrequency emitter and its power supply source which may be a battery or advantageously an electrokinetic generator which is advantageously completed by a super-capacitor. The main casing further comprises a suitable receiver for receiving the emitted signals when the remotely deployed portion is in motion. In the case of this alternative, the override operation according to the invention is based on the disconnection of the appliance from the electric mains by the device by the absence of detection of movements during a period of time determined beforehand although the pilot appliance is in a running functional state. In the case of the appliance in action corresponding to FIG. 16, the connection of the iron to the electric mains is maintained as long as movements of the remotely deployed portion arrange for the disconnection time-out not to elapse.

Advantageously, regardless of the alternative embodiment, a sound alarm signals the imminent disconnection of the appliance before expiry of the disconnection time-out so that the user informed about the imminence of the disconnection acts in order to induce restarting of the time-out if he/she desires to continue using the appliance.

Figure 17:
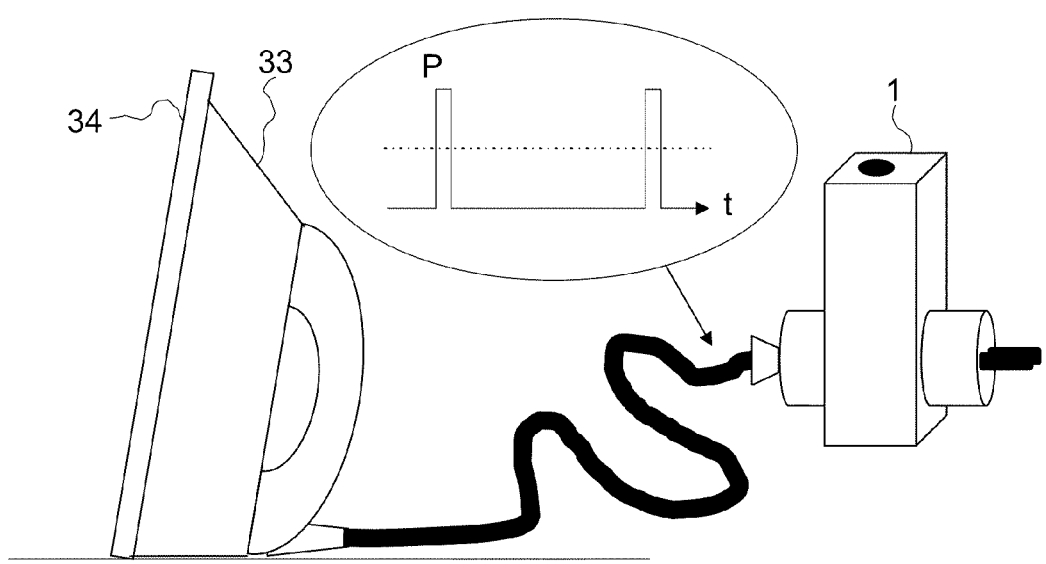
FIG. 17 illustrates the first alternative for a heating appliance at rest.

FIG. 17 illustrates the first alternative for a heating appliance at rest.

The heating sole 34 is no longer in contact with materials capable of absorbing heat. In this situation, not very much energy is required for maintaining the iron 33 at its set temperature. The heating time is short and the time during which the resistor is not powered is long. The automatic disconnection time-out which is not restarted elapses and leads the device 1 to disconnecting the appliance.

In the case of an application of the invention according to the second alternative described in the discussion of FIG. 16, the absence of movement of said remotely deployed portion lets the automatic disconnection time-out elapse which ensures definitive disconnection. When the device has disconnected the appliance, any new connection of the appliance requires voluntary action on the button for starting the device.

Figure 18:
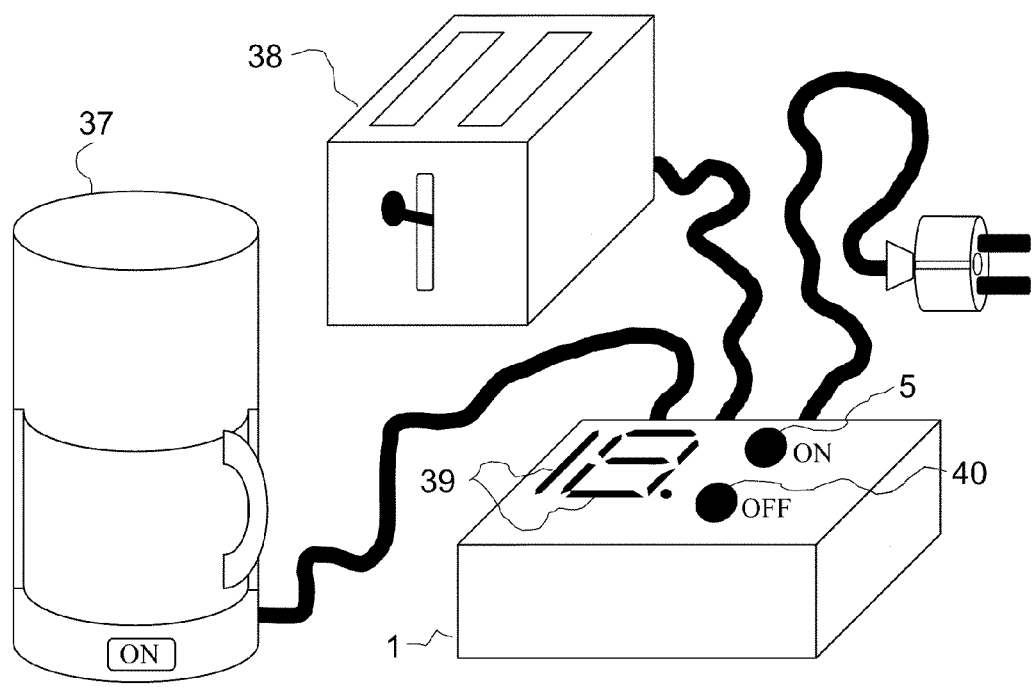
FIG. 18 illustrates another alternative for a heating appliance.

FIG. 18 illustrates another alternative for a heating appliance.

This example illustrates the application of the invention within the scope of a device for automatically disconnecting small electric domestic appliances such as a coffee machine 37, a toaster 38. In this example, the pilot appliance is the coffee machine 37 which has the longest operating cycle. The preferred alternative of the device in this context comprises, in addition to the start button 5, a time down-counter 39 which allows deferred starting. In other alternatives it is provided that the deferred starting is based on a real-time clock and on means for programming the time for deferred starting. The time down-counter provides the advantage of not requiring any setting of the time of a clock, an extreme simplicity of use in particular if a function for automatically storing the previous adjustment is applied, which is recalled when the start button 5 is pressed for the first time. A stop button 40 advantageously completes the device although it is not indispensable since stopping the pilot appliance necessarily leads the device to cutting off its power supply when the automatic disconnection time-out elapses. Thus, the control of the appliances by the device according to the invention assumes that the pilot appliance is adjusted beforehand when it is running.

Figure 19:
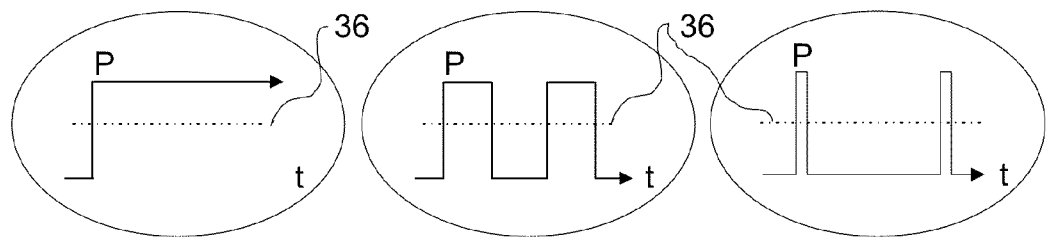
FIG. 19 illustrates the other alternative for an operating heating appliance.
Figure 19:
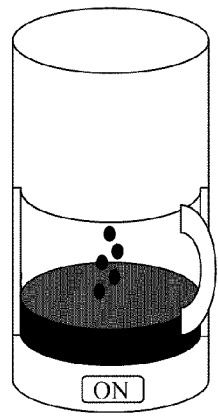

FIG. 19 illustrates the other alternative for a heating appliance in action.

In the example described earlier, FIG. 19 illustrates the step of the operation of the appliance which follows its starting. During this step for producing coffee, the rated power of the appliance is continuously consumed. The power is further continuously greater than the comparison threshold 36 determined beforehand.

Figure 20:
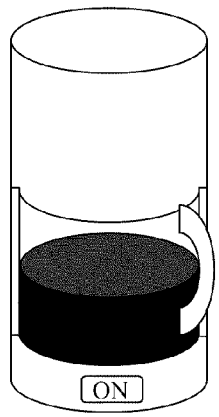
FIG. 20 illustrates the other alternative for a appliance maintaining temperature.

FIG. 20 illustrates the other alternative for a heating appliance for maintaining temperature.

In the example described earlier, FIG. 20 illustrates the step of the operation of the appliance which follows the end of the production of coffee. This potentially endless step corresponds to keeping the coffee warm by periodic heating times resulting from the action of the thermostat comprised in the appliance. The characteristic power curve of this step shows heating times with a relatively long duration which are related to the thermal inertia of the mass of liquid, the temperature of which has to be raised. The power consumed by the appliance alternately passes above and below the comparison threshold 36 of the device allowing the latter to determine the justified keep-warm functional state of the pilot appliance and therefore to maintain its connection to the electric mains.

Figure 21:
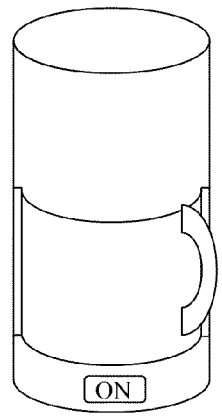
FIG. 21 illustrates the other alternative for a heating appliance without any load.

FIG. 21 illustrates the other alternative for a heating appliance without any load.

In the example described earlier, FIG. 21 illustrates the step of the operation of the appliance in the keep-warm state already illustrated by FIG. 20 when the bowl is empty or when the bowl is removed from the heating sole of the appliance. The absence of thermal inertia causes a reduction in the heating time measured by the device when the power is greater than the comparison threshold 36 and leads it to automatically disconnect the appliances from the electric mains after noticing that the heating time is less than a threshold determined beforehand. Of course, the case of stopping the pilot appliance or of disconnecting its power plug may be considered as the particular case of a heating time of zero duration and therefore less than any value of the threshold 36 determined beforehand. This particular case undoubtedly leads the device to automatically disconnecting the appliances from the electric mains.

FIG. 22 illustrates interactive means for preparing the configuration.

This example shows an exemplary page 50 for preparing interactively the configuration of a given device. The step for preparing the configuration first comprises a sub-step 51 for identifying the device to be configured. Identification of the device may be accomplished by any means for reading a piece of identification information associated with the device or by explicit input of the identification elements by the user. For example, the identification sub-step may comprise a sub-step for designating the brand of the device, a sub-step for designating the category of device if required, a sub-step for designating the reference of the device. When the device to be configured is identified, an image of the device 52 may advantageously be displayed allowing visual confirmation of the identification. Depending on the characteristics of the identified device, selectable options 53 and/or adjustable parameter values 54 are proposed to the preparation operator. Options and default adjustments corresponding to the factory adjustments of the device are advantageously proposed as initial values of the possible selections so as to be able to only change the parameter(s) of interest without having to exhaustively process the whole of the parameters. In certain alternative embodiments, it is also provided that only the selections and/or the adjustments which are of interest to the preparation operator be updated. The most sophisticated alternatives of the invention comprise bidirectional transmission means for exchanging information between the device and the equipment used for the configuration. In these alternatives, the equipment used for the configuration reads and displays the selection and adjustment values of the device which are the initial proposed values. When the selections and/or the adjustments carried out during the preparation step suit the preparation operator, depending on alternative embodiments, a command 55 is proposed for emitting said at least one piece of information in relation with the configuration to the device via means provided for this purpose or a continuous loop emission is proposed with automatic updating gradually as the preparation operator makes selections.

In certain alternative embodiments, provision is made for transmitting said at least one piece of information in relation with the configuration to the device by indicating an area of the screen 56 where it is intended to put an optical sensor of the device. The information is transmitted by a binary modulation of the emission of light with 0 or 100% of the maximum luminosity. In other alternatives, the transmission of said at least one piece of information in relation with the configuration uses the sound reproduction chain or further a link with an input/output port of the piece of equipment.

The processing operations associated with the interactive preparation of the configuration are locally executed in the appliance supporting the interaction with the user or on a remote server. Any appliance provided with the screen and with means allowing the selections of the preparation operator to be entered, is suitable for executing this step. This may for example be a computer, a digital television set, a Set Top Box using an external screen and for example a remote control for the selections. Smartphones may also be used, which are capable of downloading specific applications or having a browser for executing scripts and/or accessing pages from a remote server connected to the network.

FIG. 23 illustrates other means for preparing the configuration.

This example illustrates a more sophisticated alternative for supporting interactivity using a screen for preparing the configuration. Potentially several pages or a larger page than the viewing window and additional selections such as the selection of the language used 57 are proposed thereon. Advantageously, access to aids and/or explanatory videos 58 is proposed. In addition to the possibilities of transmitting to the device on command or automatically in a loop, which have been described earlier, a command 59 is also provided for producing a file containing said at least one piece of information in relation with the configuration. This file is capable of being exploited subsequently by an application in relation with the means for transmitting the information to the device. This possibility illustrates a particularly advantageous characteristic of the method according to the invention which is the possible separation of the preparation and emission steps. Thus, files corresponding to typical preparations for devices and frequent given cases of use may be prepared by professionals and proposed for downloading, for example on websites of the brands of the devices, so that general public users without any technical education are able to read these files by means of current applications for configuring their devices. It is also provided that the preparation application automatically names the file by using strings of characters from identification information of the device and possibly other pieces of information in relation with the main selections made. Thus the name of the file which is produced at the end of the preparation step gives in clear text a first level of information facilitating subsequent exploitation of the file. Still more advantageously, additional descriptive information is included in the files. For example these are metadata allowing a multicriterion search. When said at least one piece of information in relation with the configuration is coded as a digital audio file in a recognized standard such as mp3, wma, flac, Ogg, wave or other formats, the native systems of metadata provided for music such as ID3 tag, will advantageously be reused within the scope of the invention, including the possibility of including into the file the photograph of the device in the space provided for the cover of a music album. The same applies in the case of the use of standards for coding digital video, for MPEG 1/2/4, wmv, fly, avi, rm, rmvb, etc. Provision is made for transmitting said at least one piece of information in relation with the configuration preferentially by using the sound reproduction chain, whether these are means exclusively dedicated to sound or means dedicated to video for which all or part of the associated audio chain is used within the scope of the invention. In certain applications, provision is also made for using the image reproduction chain.

FIG. 24 illustrates the interactive configuration by means of a computer.

The use of any means accessible to the general public is provided for locally executing or on a remote server, an application for preparing said at least one piece of information in relation with the configuration and optionally for transmitting it to the device to be configured.

The relevant appliances are for example fixed or portable computers 60 as well as an increasing number of pocket appliances such as for example Smartphones. These appliances are the support of the interaction with the user for producing said at least one piece of information in relation with the configuration from selections of the user as illustrated by the examples of FIGS. 22 and 23. It is provided that the same means be also used for emitting the information towards the device 1 to be configured. It is provided that any generic input/output port 61 or that any integrated resource in relation with the reproduction of the sound and/or of the image provided by a standard piece of equipment may be used for emitting said at least one piece of information. FIG. 24 illustrates the use of an output port for earphones which is used in this example for connecting the primary of a magnetic inductor 62 which emits the information which is received by the device by means of a secondary inductor placed behind the insulating wall of the casing of the device. It is also provided that other input/output ports such as USB, IEEE 1394, analog or digital line output or further wireless connection means such as WiFi, Bluetooth, FM TX be used by applying suitable means for emitting and/or for receiving the information without departing from the scope of the invention.

FIG. 25 illustrates the configuration by the sound from a computer.

This example illustrates the use of any standard means 63 for reading audio and/or video files comprising a sound track for emitting said at least one piece of information in relation with the configuration to the device to be configured. The files contain said at least one piece of information in relation with the configuration and have been produced beforehand during the preparation step. In this example, the device 1 comprises a microphone, under its remote control 2, which gives the possibility of receiving said at least one piece of information emitted by a loudspeaker 64 reproducing the sound encoded in the file. Advantageously, if this is a video file, the screen may for example display instructions as texts, cartoons or video sequences. In the case of the reproduction of sound with several channels, it is provided that one channel be reserved to said at least one piece of information in relation with the configuration and the other channel(s) broadcast different contents, for example information in relation with the contents of the configuration and/or with the operating mode for configuring the device.

FIG. 26 illustrates the configuration by the sound from a television set.

This example illustrates the possibility of using sound and/or image reproduction resources of a television set 30 for emitting said one piece of information in relation with the configuration after optionally reception or downloading of the corresponding multimedia object or further after a step for preparing said at least one information. It is provided that the interaction with the user for preparing said at least one piece of information in relation with the configuration be applied by means comprised in the television set or in an external piece of equipment such as a Set Top Box 31 connected to the television set. The user selects options on the screen and/or among values by using a remote control 22. In this example, said at least one piece of information in relation with the configuration of the device 1 is emitted by the loudspeaker 64 of the television set 30 and received by a microphone place under the remote control casing 2.

FIG. 27 illustrates the configuration by means of a telephone step 1.

This is a particularly preferred embodiment of the method according to the invention within the scope of a system comprising a configurable device according to the invention and a standard telephone 65 used both as a piece of equipment for producing at least one piece of information in relation with the configuration of the device and as a piece of equipment for emitting it to the device to be configured. It is provided that any telephone may be used within the scope of the invention, a wired telephone, a domestic wireless telephone, for example DECT, a wireless cellular telephone of any generation or VoIP terminals on IP networks. In a first alternative it is provided that only the basic voice functions be activated by using a voice server in order to present the selections to the user, and optionally the explanations and/or messages with a promotional nature. The selections of the user are known to the server by the detection of pressing actions on the keys of the telephone and/or by voice recognition capabilities in the server. The application of the invention is also provided via downloadable applications in Smartphones such as iPhone, Android telephones, mobile Windows telephones, Blackberry, etc. During the first step of the method according to the invention, the user allows the server to identify the device to be configured. An explicit designation is provided by selections in a tree structure of proposals or further for telephones provided with a still camera and insofar that this is allowed by the server, the identification may be accomplished by recognizing the device by the image in a photograph comprising characteristic elements. This may be for example a snapshot of the front face, where the brand and the version of the device are inscribed, or a label grouping pieces of information on the device. Provision is also made for identifying the device by a snapshot and then by automatically recognizing the barcode which is associated with it. When the device is at least partly identified, the server proposes selections in relation with the configuration of the device.

FIG. 28 illustrates the configuration by means of a telephone step 2.

This figure illustrates a step relating to the device. The question is of placing the device 1 in a situation for receiving said at least one piece of information in relation with its configuration. This optional step is nevertheless advantageous in that it aims at preventing any undesired modification of the configuration of the device. This is a useful precaution when said at least one piece of information in relation with the configuration of the device is transported by a medium such as sound or light which may be found in the environment of use of the device. In the proposed example, entering the mode for receiving said at least one piece of information in relation with its configuration is accomplished by pressing on a button 5 upon powering up 66 the device 1. This may also be accomplished for example by pressing on a particular combination of keys or on a button dedicated to configuration. In certain alternatives it is provided that said preparation step be only a step for selecting said at least one piece of information in relation with its configuration from a set of versions prepared beforehand. Advantageously, a coupling part 67 is provided, made in a flexible material, for example compact foam or silicone, for ensuring efficient acoustic coupling both with the emission means having a planar surface which will be supported on the outer surface 68 of the coupling part and with individualized earphones generally having an outer diameter of the order of 16 mm. Said coupling part has a bore 69 with a diameter of the order of 14 mm which is capable of allowing the material of a standard earphone to be inserted and held by elasticity. The thickness of the coupling part and the nature of the material further allow it to assume the function of a supporting point under the casing of the device in contact with the laying surface.

FIG. 29 illustrates the configuration by means of a telephone step 3.

This figure illustrates the step for emitting by the telephone said at least one piece of information in relation with the configuration of the device. According to the alternatives, it is provided that the execution of this step be automatic at the end of the preparation step or that it be executed on an explicit command from the user. In this example, after having optionally carried out a suitable command, the user places the telephone 65 and/or the device 1 so that the device receives said at least one piece of information in relation with its configuration emitted by the telephone. In this example the sound output orifice of the telephone is applied against the planar surface of the coupling part.

FIG. 30 illustrates the configuration by means of a portable media player step 1.

This is a preferred embodiment of the method according to the invention within the scope of a system comprising a configurable device 1 according to the invention and a portable media player or a multimedia reading function of a multifunction portable appliance. The portable media player is used in this example only for emitting said at least one piece of information in relation with the configuration of the device. Of course, it would also be possible to execute a preparation step on the same appliance in the case of a more sophisticated portable media player capable of receiving and executing specific applications or capable of accessing Internet and/or executing Java applets, scripts, programs which may be executed in an Internet browser such as those for example written in Flash. In the example of FIG. 30, the user prepares and/or receives from the outside, for example by downloading on Internet, a digital object prepared beforehand. This digital object is for example an audio, video file, or a file associated with a cartoon. The file, for which the compatibility of the format with the readout possibilities of the portable media player has been checked beforehand is copied into the memory of the portable media player by any wired or non-wired means.

FIG. 31 illustrates the configuration by means of a portable media player step 2. Opening of the configuration session of the device as described for FIG. 28 in the context of a use of a portable media player instead of a telephone.

FIG. 32 illustrates the configuration by means of a portable media player step 3. This figure illustrates the step for emitting via the portable media player 70 said at least one piece of information in relation with the configuration of the device 1. The user controls the reading of the digital object containing said at least one piece of information in relation with the configuration of the device after having placed it in a position in which the device is capable of receiving it. Refinements are provided such as repeating several times said at least one piece of information during the reading of the file. Thus, the probabilities of obtaining complete reception by the device are increased. This refinement is completed in the device by closing the configuration session automatically as soon as said at least one piece of complete and valid information has been received which avoids any problem of incomplete reception in the case of repeating the emission. Very advantageously, as these are means for reproducing stereophonic sound, a single channel 72 will be used for transporting said at least one piece of information in relation with the configuration, the other channel 73 will be used for emitting information to the user. Sound reproduction through individualized earphones lends itself well to this particularity of the invention. The advantageous use of a coupling part 67 as described within the scope of FIG. 28 allows improvement in acoustic coupling while maintaining the earphone 72 by tightening it in the adequate position after insertion in the bore of the part 67.

Of course, the invention is not limited to the examples which have just been described and many adjustments may be made to these examples without departing from the scope of the invention, notably as regards the number, the type and the position of the connectors, the way of laying out the interface with the user. The standards and norms which are cited in this document as an example are by no means limiting, their equivalents as well as their successors enter the scope of the invention.

The invention claimed is:

1. A device for disconnecting an electric power supply of at least one appliance, said at least one appliance comprising at least one main pilot appliance, the only one appliance in the case of a single appliance being a main pilot appliance, the device comprising:
    means for linking said device to an electric mains; and
    means for linking to the electric power supply of said at least one appliance; and
    means for connecting to the electric mains and for disconnecting from the electric mains the electric power supply of said at least one appliance, including said at least one main pilot appliance; and
    means for controlling the electric power supply of said at least one appliance, including said at least one main pilot appliance, in relation with the functional state of said at least one main pilot appliance or of a command from the user;
    means for entering into an override operating mode relatively to a first operating mode where the electric power supply of said at least one appliance is disconnected from the electric mains when said at least one main pilot appliance is in standby or stopped, said override operating mode causing the device to establish or to maintain continuously the connection to the electric mains of the at least one appliance although said at least one main pilot appliance is in a stopped or standby functional state; and
    means for exiting said override operating mode and causing a return to the first operating mode where the electric power supply of said at least one appliance is disconnected when said at least one main pilot appliance is in standby or stopped, said means for exiting said override operating mode comprising, in the case where said at least one main pilot appliance has a constant power curve over time, an automatic exit consecutive to any change in functional state of said at least one main pilot appliance.

2. The device according to claim 1, wherein the means for exiting said override operating mode exploits a detection of an event without any direct relation with the functional state of said at least one main pilot appliance, the detection of the event being without any direct relation with the functional state of said at least one main pilot appliance causing the return to the operating mode where the electric power supply of said at least one appliance is disconnected when said at least one main pilot appliance is in standby or stopped.

3. The device according to claim 1, wherein the means for exiting said override operating mode further exploits an absence of detection, for a period of time determined beforehand, of an event without any direct relation with the functional state of said at least one main pilot appliance, the absence of detection, for a period of time determined beforehand, of the event without any direct relation with the functional state of said at least one main pilot appliance causing the return to the first operating mode where the electric power supply of said at least one appliance is disconnected when said at least one main pilot appliance is in standby or stopped.

4. The device according to claim 1, further comprising:
    means for determining the functional state of said at least one main pilot appliance in a case of a variable power curve over the time, by comparison between information representative of the power consumed by said at least one main pilot appliance and at least one first threshold determined beforehand and by measuring durations in relation with the result of the comparison.

5. The device according to claim 1, further comprising:
    means for linking and for permanently powering at least one secondary pilot appliance.

6. The device according to claim 5, further comprising:
    means for giving information representative of the power consumed by the at least one secondary pilot appliance that is permanently powered;
    means for determining the functional state of said at least one secondary pilot appliance by comparison between said information and at least one threshold determined beforehand that is dedicated to said at least one secondary pilot appliance;
    means for supplying power to at least one other appliance when the power consumed by said at least one secondary pilot appliance is greater than or equal to a dedicated threshold determined beforehand regardless of the power consumed by said at least one main pilot appliance; and
    means for cutting off the electric power supply of at least one other appliance when the power consumed by said at least one secondary pilot appliance is less than a dedicated threshold determined beforehand and when said at least one main pilot appliance is in a stopped or standby functional state.

7. The device according to claim 6, wherein said at least one other appliance, controlled in relation with the power consumed by said at least one secondary pilot appliance, does not comprise said at least one main pilot appliance.

8. The device according to claim 1, further comprising:
means for receiving and for interpreting at least one command in relation with the override operating mode.

9. The device according to claim 1, further comprising:
means for counting time.

10. The device according to claim 1, further comprising:
means for at least partly automatically entering in the override operating mode.

11. The device according to claim 1, further comprising:
additional means for at least partly automatically exiting from the override operating mode.

12. The device according to claim 1, further comprising:
means for signaling override operation.

13. The device according to claim 1, further comprising:
means for linking and for suitably handling at least one portable appliance comprising a rechargeable standalone power source.

14. The device according to claim 1, further comprising:
means for transmitting information, with no added wires, to at least one external piece of equipment.

* * * * *